United States Patent
Burkett et al.

(10) Patent No.: US 6,383,608 B1
(45) Date of Patent: May 7, 2002

(54) METHOD FOR FORMING A FOAM PRODUCT WITH ENHANCED FIRE RESISTANCE AND PRODUCT PRODUCED THEREBY

(76) Inventors: William Burkett, 9393 E. State Highway, A. D., Rogersville, MO (US) 65742; Marvin Carnahan, c/o Diversified Plastics, 108 W. Mt. Vernon, Nixa, MO (US) 65714

( * ) Notice: Subject to any disclaimer, the term of this patent is extended or adjusted under 35 U.S.C. 154(b) by 0 days.

(21) Appl. No.: 09/154,086

(22) Filed: Sep. 16, 1998

(51) Int. Cl.[7] .............................. B32B 3/00; B32B 5/18; B29D 9/00; B29C 33/48
(52) U.S. Cl. ................. 428/173; 428/308.4; 428/317.9; 428/317.1; 428/920; 428/921; 264/45.1; 264/45.3; 264/48
(58) Field of Search ...................... 169/58, 62; 428/173, 428/308.4, 317.9, 319.1, 920, 921; 264/45.1, 45.3, 48

(56) References Cited

U.S. PATENT DOCUMENTS

| | | |
|---|---|---|
| 3,813,463 A | 5/1974 | Conger |
| 3,925,526 A | 12/1975 | Haas |
| 3,962,155 A | 6/1976 | Usamoto et al. |
| 3,991,252 A | 11/1976 | Kolakowski et al. |
| 4,119,583 A | 10/1978 | Filip et al. |
| 4,136,215 A | 1/1979 | den Otter et al. |
| 4,191,722 A | 3/1980 | Gould |
| 4,194,026 A | 3/1980 | Goodale et al. |
| 4,307,200 A | 12/1981 | Lichler et al. |
| 4,314,036 A | 2/1982 | Throne et al. |
| 4,366,204 A | 12/1982 | Briggs |
| 4,369,064 A | 1/1983 | von Bonin |
| 4,425,440 A | 1/1984 | Bloembergen et al. |
| RE31,757 E | 12/1984 | Kennedy |
| 4,708,977 A | 11/1987 | Miutel et al. |
| 4,780,167 A | 10/1988 | Hill |
| 4,992,481 A | 2/1991 | Von Bonin et al. |
| 5,026,736 A | 6/1991 | Pontiff |
| 5,057,546 A | 10/1991 | Sudan |
| 5,305,569 A | 4/1994 | Malmquist et al. |
| 5,307,604 A | 5/1994 | Tasso |
| 5,422,170 A | 6/1995 | Iwata et al. |
| 5,425,207 A | 6/1995 | Shayman |
| 5,476,681 A | 12/1995 | Sampara et al. |
| 5,552,185 A | 9/1996 | De Keyser |
| 5,615,523 A | 4/1997 | Wells et al. |
| 5,686,514 A | 11/1997 | Bayha et al. |

OTHER PUBLICATIONS

*Kirk–Othmer Encyclopedia of Chemical Technology, Third Edition,* "Fluorine Compounds, Surface Chemistry", pp. 82–127, No Date Given.
Standard Test Methods for Fire Tests of Roof Coverings, pp. 502–513, Designation: ASTM E 108–90, No Date Given.
Sales Brochure on "Inkjektorking Vario Filling Gun EPS" with drawing (single page), No Date Given.

*Primary Examiner*—Blaine Copenheaver
*Assistant Examiner*—Ula C. Ruddock
(74) *Attorney, Agent, or Firm*—Smith, Gambrell & Russell LLP

(57) ABSTRACT

A foam body structure formed of plastic foam with one or more flame retardant reception cavities formed in the main body either simultaneously with an initial foam body formation process such as expandable plastic bead molding or subsequent to the foam body formation such as by melting, drilling or cutting. A solid flame retardant such as one in granular form is preferably supplied in sufficient quantity as to entirely fill the volume defined by the reception cavities. A covering or coating is provided over the flame retardant material to fix the material within the cavities. The volume and distribution of the reception cavities and the amount of the chosen flame retardant received in the cavities is sufficient to provide an essentially common flame retardation quality or characteristic over the entire volume of foam body (or at least the volume that could be exposed to a flame in its intended use).

39 Claims, 14 Drawing Sheets

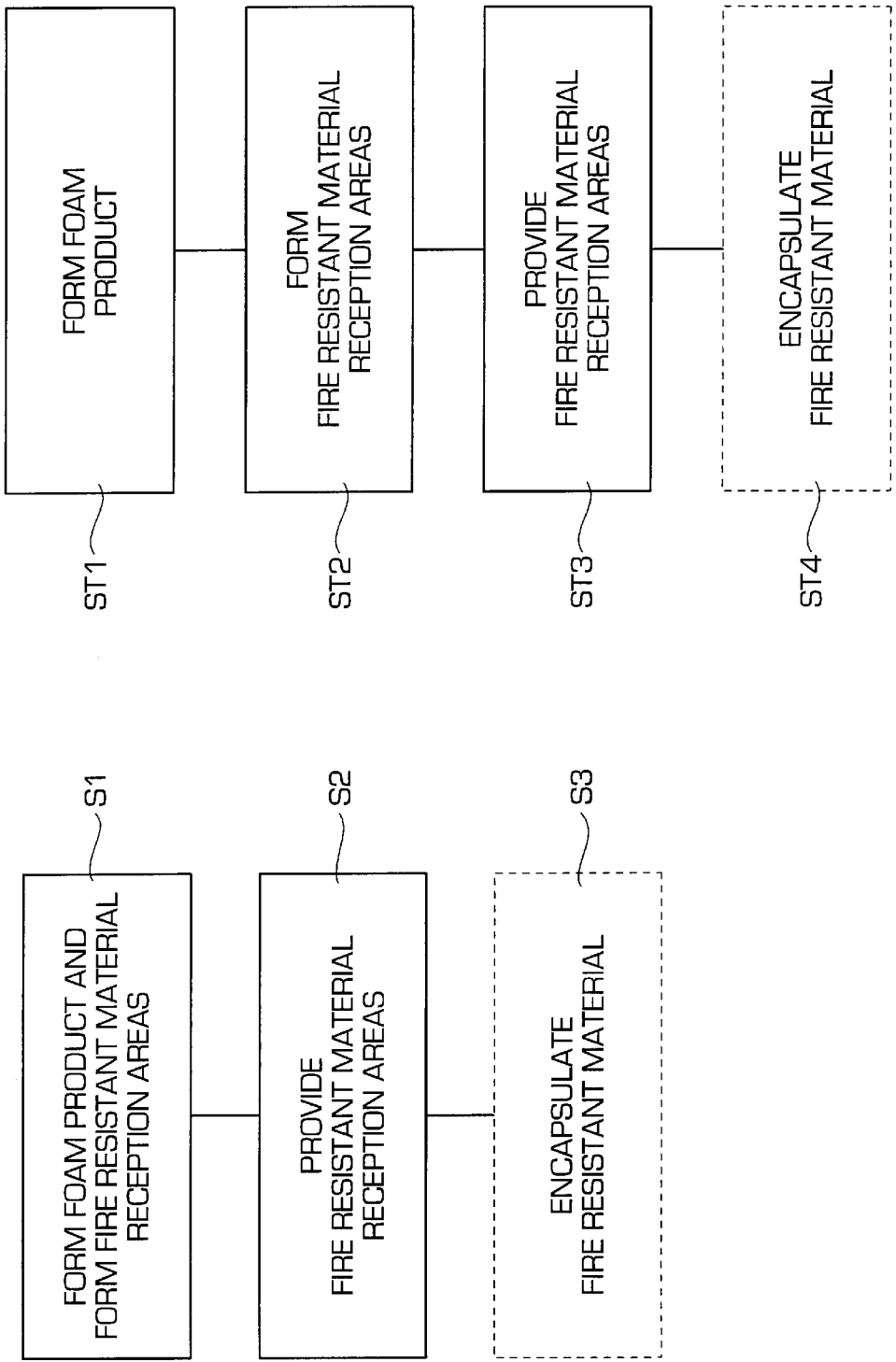

METHOD FOR FORMING A FOAM PRODUCT WITH ENHANCED FIRE RESISTANCE AND PRODUCT PRODUCED THEREBY

FIELD OF THE INVENTION

The present invention pertains to a method and apparatus for producing a foam or cellular, plastic product, particularly a foamed plastic product having enhanced fire resistance, and products produced by that method and apparatus.

BACKGROUND DISCUSSION

Foam plastics can be prepared by a variety of methods including, for example, an expansion process which includes expanding a fluid polymer phase to a low density cellular state and then preserving this state. A variety of manufacturing processes have been developed to achieve the steps required in an expansion process which typically include creating cells in the fluid or plastic phase, causing the cells to grow to a desired volume and stabilizing the cellular structure by physical and/or chemical means. The growth of the cells depends on the pressure differential between the cells and the environment and growth can be achieved either (a) by lowering the pressure of the external environment (decompression) or (b) by increasing the internal pressure in the cells (pressure generation) or (c) a combination of both.

Foamable compositions in which the pressure within the cells is increased relative to that of the surrounding environment have generally been called expandable formulations. Polystyrene is one of many materials used in the formation of a foam plastic in an expandable formulation process coupled with a physical stabilization process. One technique features the polymerizing of a styrene monomer in the presence of a blowing agent so that the blowing agent is entrapped in a polymerized bead. Typical blowing agents used in such processes are the various isomeric pentanes and hexanes, halocarbons, and mixtures of these materials.

The fabrication of these expandable particles into a finished cellular-plastic article is generally carried out in two steps. In the first step, the particles are expanded by means of steam, hot water, or hot air into low density replicas of the original material, called prefoamed or preexpanded beads. After proper aging, enough of these prefoamed beads are placed in a mold to just fill it; the filled mold is then exposed to steam. This second expansion of the beads causes them to flow into the spaces between beads and fuse together, forming an integral molded piece. Stabilization of the cellular structure is accomplished by cooling the molded article while it is still in the mold. The density of the cellular article can be adjusted by varying the density of the prefoamed particles.

Polyvinyl chloride and polyethylene are just a few examples of other materials, usually in beaded form, that are used in an expansion formulation process coupled with a physical stabilization process (e.g., cooling).

Another common cellular foam often used in an expansion formulation process is polyurethane. However, the cell growth of polyurethane is often controlled, at least for the most part, by a chemical stabilization process rather than relying solely on a physical stabilization process. The general method of producing cellular polyurethane is to mix a polyfunctional isocyanate with a hydroxyl-containing polymer along with the catalyst necessary to control the rate and type of reaction and typically other additives to control the surface chemistry of the process and to adjust the conditions and reactants such that the exotherm of the reaction causes expansion of the foam considerably.

Other processes for forming cellular products include decompression processes such as extrusion and injection molding. Again, either physical or chemical methods may be used to stabilize products of the decompression process. Provided below are just some examples of forming cellular product formations which include the use of decompression expansion techniques with polystyrene used as a polymer example.

Extruded polystyrene—A solution of blowing agent in molten polymer is formed in an extrusion under pressure and then released such that the blowing agent vaporizes and causes the polymer to expand. As an alternative to introducing a solution of blowing agent, polystyrene beads or pellets containing pentane blowing agent has been used particularly for forming low density, extruded foam sheets.

Injection Molding Polystyrene—Polystyrene granules containing dissolved liquid or gaseous blowing agents are used as feed in a conventional injection-molding process. With close control of time and temperature in the mold and use of vented molds, high density cellular polystyrene molding can be obtained.

Another example of a plastic foam formation process is found in a reaction injection molding or RIM process wherein polyurethane structural foam products are formed by metering into a temperature controlled mold a polyol and isocyanate to generally fill 20% to 60% of the mold depending on the density of the structural foam parts. When the reaction mixture then expands to fill the mold cavity, it forms a component part with an integral, solid skin and a microcellular core.

The foregoing represents just a few examples of the numerous processes used in the industry to form foam plastic products.

Coupled with the expanded use of foam bodies in a variety of fields, there has also been activity in the development of foam component structures having some degree of fire resistance. The prior art techniques include, for instance, providing a higher density, thickened outer layer or skin (e.g., see U.S. Pat. No. 4,191,722 with its thick-skinned roofing panels said to improve fire resistance). Another technique involves protecting the foam core with a fire retardant outer covering such as in U.S. Pat. No. 3,991,252, with protective fire retardant Gypsum layer. U.S. Pat. No. 4,136,215 describes the layering of a thin, continuous layer of inert particulate material under a still curing thermosetting foam layer (e.g., clay, sand, etc.) such that the particulate material penetrates to some extent and adheres to the foam material.

The prior art also describes the introduction of fire resistant material into the original precursors or ingredients being used in the formation of foam material used in products. These flame retardant additives which retard the surface spread of flames include, for example, halogenated materials, antimony trioxide, alumina trihydrate, borates and phosphates (see, for example, U.S. Pat. No. 4,366,204 directed at polyurethane and polyisocyanate rigid foam panels). The introduction of the flame retardant material in with the original precursors does facilitate a wide dispersion of the flame retardant material. However, in large quantities, the flame retardant material can preclude proper formation of the final product or degrade the quality of the product (particularly for situations where the required flame retardation is high as the higher quantity of flame retardant material can create problems in preparing quality products with certain desired characteristics or starting materials). The inventors have determined, for example, that while the initial dispersement of flame additives (e.g., boron) in with reactive foam mix precursors in a die mold allows for acceptable products for car manufacturing, when dealing with sufficient flame retardant additives to satisfy building code levels proper fusing and foam formation did not occur. This was also true with respect to the initial mixing of expandable plastic beads in with fire retardant material as the amount of flame additives needed to satisfy building code levels or standardized association requirements (e.g., ASTM E 108-90—"Standard Test Methods for Fire Tests of Roof Coverings" and ANSI/UL (Underwriters Lab, Inc.) 790—DEVELOPMENTAL SPREAD OF FLAME TEST, which are incorporated herein by reference in their entirety), would result in unacceptable products. That is, the blending of fire retardant materials with expanded plastic beads prior to the molding process failed to produce an acceptable fire retardant foam product either due to the product not properly forming or the failure to satisfy the requirements in, for example, the Class A level of the aforementioned ANSI/UL 790 Test.

SUMMARY OF THE INVENTION

Among other things, the present invention is directed at providing a plastic foam or cellular body with a high fire resistance or flame spread retardation characteristic, while also providing for proper formation of the plastic foam material to provide a high quality foam product.

The advantageous features of the present invention include a foam body structure having a foam body with one or more flame retardant reception cavities formed therein and a flame retardant material received by said one or more flame retardant cavities with the cavity arrangement and flame retardant dispersion being sufficient in the foam body to satisfy, for example, established fire resistance building code levels and applicable association standards and the like, such as the fire test requirements set out in ASTM E 108-90 or ANSI/UL 790. The method of the present invention includes the formation of reception cavities commensurate with the formation of the foam product as well as the formation of reception cavities after formation of the foam product. Thus, the present invention is applicable to a wide variety of foam production methods. The present invention, particularly from the standpoint of formation of reception cavities commensurate with foam body formation, is particularly well suited for use in conjunction with plastic foam products produced through mixed liquid precursors (causing the crosslinking of a thermosetting resin; such as polyester resin, concurrently with the production of carbon dioxide by the reaction of a carbonite with an inorganic acid) and the formation of formed molten plastic particles from expandable plastic particles such as copolymer beads having a polymer outer coating, and a blower core of pentane or the like. The present invention, with its high fire resistivity characteristics, is also particularly well suited for the production of foam body construction items such as shingles and wall panels and also as wood substitutes for furniture and other furnishings.

Under one technique of the present invention, following full formation of the expanded foam body, a repeating pattern of flame retardant reception cavities are formed in the foam body. The reception cavities are sufficiently dispersed in (and/or over) the foam body and sufficiently sized as to provide a sufficient number and size of cavities to receive enough flame retardant additive material to pass the upper level requirements (e.g., Class A) of standardized fire resistance tests such as the aforementioned ANSI/UL 790 and ASTM E 108 90 Tests. The flame retardant additive is provided to the reception cavities preferably either in solid, liquid, or gaseous form or a combination thereof. A variety of sealing techniques for encapsulating the flame retardant material within the reception cavities are used in the present invention, particularly when using solid inhibitors (e.g., granular, tablet or powder form). A standard coating or laminate layer used in the field can be used as an encapsulator and can be one that either has or does not have an added flame retardant quality as the material in the reception cavities is preferably capable of meeting the aforementioned standards in and of itself for most foam body structures and intended uses thereof.

As the above described Tests require the whole component or article to meet the particular requirements set forth, the reception cavity (or reception cavities are) is preferably sufficiently spread over the surface of the foam body to allow for a uniform fire resistance over the entire foam body in the aggregate. That is, enough fire retardant additive is provided such that when the product is subjected to a flame, there is sufficient fire retardant distribution to cover 100% of the product (i.e., to prevent the product from burning or flames from spreading over the entire volume of the product within the requirements of, for example , the aforementioned ANSI/UL 790 Test).

The reception cavities include, for example, repeating rows of spaced reception cavities that are in the form of vertical holes having a top end opening out at an exterior surface of said foam body and a closed off bottom end. Holes such as frusto-conical holes that extend through 25% to 95%, and more preferably 75% to 95%, of a vertical thickness of said foam body are suitable for use in the present invention.

Another embodiment of the present invention features a plurality of reception cavities that are formed in the foam body so as to extend internally within the foam body below an upper or first surface of a body and above a lower or second surface of said foam body such as reception cavities that include a first series of cavities (e.g., cylindrical) extending between two side walls of a foam body so as to leave the upper end lower surface of the foam body undisturbed or an additional second series of cavities (e.g., cylindrical) that intersect with the first series or cavities or lie on a different plane between the exposed top and bottom of the foam body. The flame retardant material is received in said one or more reception cavities. The number and size of cavities is dependent on what particular fire retardant level is needed to pass the particular test requirement desired for passing, such as the above noted ANSI/UL 790 and ASTM E 180 90 standards, while taking into consideration the material of the plastic involved and any added material such as any added laminate or the like.

Another embodiment of the present invention features a retardant reception cavity arrangement that includes one or a plurality of slits or grooves formed in an exposed surface of said foam body with the grooves or slits extending down for a depth greater than 50% of a vertical thickness of said foam body.

The foam body structure can further comprise a covering positioned over the reception cavities such as a conforming covering layer of a standard hardenable liquid coating which comes in contact with the flame retardant material within said one or more reception cavities, the foam material bordering said one or more reception cavities, and possibly a portion of the foam body defining the reception cavity depending on whether the reception cavity is entirely filled or only partially filled by the flame retardant material.

Alternatively, a less conforming laminate is joined to an exposed surface of said foam body within which flame retardant reception cavities are formed and extends over the surface openings formed in said foam body which are defined by the plurality of flame retardant reception cavities. A joining agent provided on the bordering regions and/or provided on the laminate's contacting surface and/or within said reception cavities can also be used to bond a laminate over the foam body so as to cover a film or pile of the flame retardant material received within said one or more reception cavities. The laminate or coating can also be provided with added fire retardant material or be of a type that inherently is fire retardant. Alternatively, the laminate can be of a type that is not fire retardant or actually promotes flame spread on its own, were it not for the flame retardant function of the material in the main foam body.

The present invention also features a method of forming a flame retardant plastic foam body structure, comprising introducing flame retardant material into one or more flame retardant material reception cavities formed in a foam body such that the flame retardant material is dispersed over a sufficient volume of the foam body to achieve a high fire retardant quality. The flame retardant material is evenly dispersed to ensure an essentially equal fire retardant characteristic over the entire volume of the foam body. For example, the reception cavities are of a sufficient volume and sufficiently dispersed so that when the reception cavities are filled or provided with the desired amount and type of fire retardant material, the flame retardation quality of the foam body is common over the entire foam body in that a flame applied to any location of the foam body will be subject to essentially equal retardation, particularly from the standpoint of flame spread parameters like those found in the above-noted ASTM E 180 90 and ANSI/UL 790 standards.

The method of the present invention preferably includes introducing flame retardant material into said one or more flame retardant reception cavities which is or are distributed over essentially all of at least one exposed surface of said foam body or internalized within the interior of the foam body.

The introduction of the flame retardant also includes introducing flame retardant to the flame retardant reception cavities which flame retardant reception cavities often need only constitute about 0.5 to 10% of the total volume of the foam body with the total volume represented by both the body of foam material and the cavities within the foam body. The 0.5 to 10% range is representative of an amount of volume needed for the fire retardant material to achieve the above noted goals of satisfying both a high quality fire retardant level (e.g., Class A of ANSI/UL 790) and also to provide equal protection at that level across the entire foam body. However, this volume range may vary either above or below depending on the particular foam material and retardant(s) utilized. Also, the number and volume of cavities can be varied to achieve the desired effect. That is, a lesser amount of larger volume cavities, as opposed to a greater number of lower volume cavities, may be more desirable, in some instances, to provide, for example, sufficient flame retardant material which is sufficiently dispersed throughout the foam body to provide sufficient fire-retardation or resistance as to pass the Class A developmental spread of Flame Test ANSI/UL 790 and similar test levels for a variety of possible products produced in accordance with the present invention (e.g., roof shingles, wall panels, and wood substitutes for furniture).

The method of the present invention includes the formation of the foam body prior to flame retardant application. For example, the foam body can be formed in a molding process, wherein the flame retardant reception cavities are formed in the foam body during the molding of the foam body. Additionally, a cover layer can be applied to the foam body following the introduction of the flame retardant material. A variety of different flame retardant materials can be utilized in the present invention both in regard to chemical composition and state. For example, a solid fire retardant material in, for example, powdered, granular, or tablet form, can be inserted into the formed cavities, preferably in a firm, packed state, and either covered or coated so as to retain its initial, relative position. Preferably, the size of the holes or reception cavities is minimized such that the quantity of solid flame retardant material fills the entire volume of each cavity. The cavities can also be partially filled if, for example, greater depth penetration is desired to help in the distribution of flame retardant so as to protect the entire volume of the foam body and wherein the flame retardant material is sufficiently effective as to not require complete filling of the holes. A variety of different depth holes, some entirely filled, some filled to different levels, can also be utilized for dispersement purposes.

The method of the present invention further includes providing cover material that is in fluid or flowable (e.g., a gel) form at the time of application and thus provides a coating cover that conforms to the surface configuration of said foam body and the upper surface of the fire retardant material in the reception cavities whether filled or not. Alternatively, or in combination with, a rigid or flexible (but not necessarily aperture conforming if the reception cavities are not entirely filled) laminate sheet extends over the one or more openings defined by said flame retardant reception cavities formed in said foam body. Particularly for forming larger fire retardant foam bodies, individual foam bodies having the fire retardant material aperture(s) can be stacked or otherwise joined together, preferably with at least one of the foam bodies covering over the apertures of another foam body.

The present invention also includes an assembly for forming a foam body with at least one flame retardant reception cavity comprising a foam material reception device with mold or article defining cavity and one or more flame retardant cavity formation members extending or positioned within said mold or article defining cavity for forming one or more grooves, holes or cavities in the body. The combination of a mold or foam material reception device and one or more flame retardant reception cavity forming members represents a modified molding system that is well suited for use in any one of the numerous techniques used in forming foam bodies, some of which are described in the background portion of the present invention. For example, the specially designed mold cavity with fire resistant material reception cavity forming means can receive the polymer material to be used in the production of the foam body from a variety of sources such as high pressure injection or extrusion feeding systems or from lower pressure systems for introducing to-be-expanded polymer material (e.g., air stream injected expandable beads or foam precursors to merge together in the mold reception cavity).

The aforementioned assembly also includes, in one embodiment of the invention, a flame retardant supply assembly opening into the mold cavity wherein said supply assembly has nozzle members or material directing means extending directly over or into the one or more flame retardant cavity formation locations in the foam body. Suitable shut off valves or the like can be used to terminate a flow of flame retardant material into a reception cavity when the desired quantity of material has passed into the reception cavity. This can include, for example, a sliding plate valve when a solid flame retardant is being supplied or a fluid shut off valve when a liquid fire retardant supply (e.g., liquid with solid particle suspension) or a gaseous flame retardant (e.g., fine powder flame retardant suspended in a gaseous delivery system) is involved.

Another feature of the invention involves a device and method for forming the desired number and size of reception cavities within an already formed foam body. This can include, for example, a support for a foam body that has reached a set-up state wherein its cells have stabilized over its entire body or essentially its entire body (e.g., sufficient setup so that cavities can be formed by an applied cavity forming means without the necessity of an encompassing mold structure to retain the shape of the foam body material to remain after cavity removal). The device and method for forming the flame retardant cavities prior to the adding of fire retardant material and after a foam body molding process is complete, can take on a variety of forms such as means for forming one or more grooves, holes or cavities by, for example, punching, routing, boring, cutting, drilling, sawing, melting or any other acceptable method.

BRIEF DESCRIPTION OF THE DRAWINGS

The advantageous aspects of the invention will be more fully appreciated from the following description, particularly when considered in conjunction with the attached drawings, wherein:

FIG. 1 shows a general outline of the process steps in one preferred embodiment of the present invention;

FIG. 2 shows a general outline of the process steps in a second preferred embodiment of the present invention;

DETAILED DESCRIPTION

Figure 3:
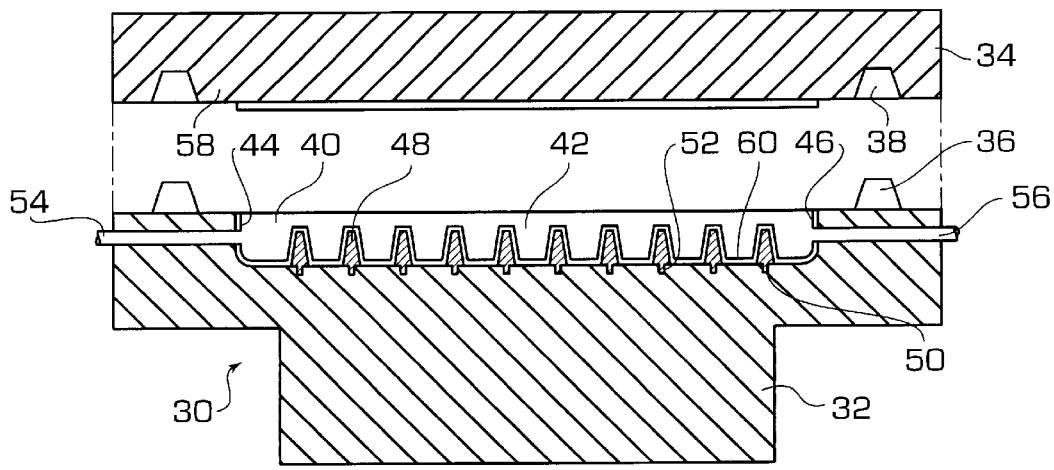
FIGS. 3–5 show a sequence of mold assembly positions in the formation of one preferred foam body embodiment of the present invention using one possible technique under the present invention.

FIG. 1 shows a general outline of one preferred method of forming fire resistant foam members of the present invention. As shown in FIG. 1, step S1 is directed at a process step wherein the foam product and fire resistant material reception areas or cavities are formed at the same time. For example, a foam body of the present invention can be formed by a molding process with the mold assembly including means for forming fire resistant material reception cavities as part of the molding process. FIG. 1 also shows step S2 wherein after the foam product with fire resistant reception cavities is formed, fire resistant material (preferably a solid granular or solid in liquid suspension) is provided to the reception cavities formed. Step S3 is shown in dashed lines as an optional additional step wherein the fire retardant material is subsequently encapsulated or covered such as by a covering film or overcoating or a laminate covering.

FIG. 2 also shows a general outline of another preferred method of forming fire resistant foam structures in accordance with the present invention. In the FIG. 2 sequence, a foam body is formed such as by a molding process. Following complete formation (e.g., following a stabilizing of the cellular structure and preferably at least the relevant foam body surface and underlying area to come in contact with the retardant being in a solid or non-cream state), the foam body is subjected to a fire retardant reception cavity formation step (ST2) wherein a device or devices contact the foam body to form at least one fire retardant reception cavity and preferably a plurality of cavities which are distributed sufficiently over the foam body and sufficiently sized to protect the foam body against flame spread. Since the number, size and location of the reception cavities can vary greatly to achieve the desired full protection of the foam body, it is difficult to provide a quantifying valve as to the positioning and size of the formed reception cavities. The general rule is to provide a sufficient number of sufficiently sized reception cavities in a sufficient dispersion pattern to provide a high fire resistance rating (e.g., Class A—ANSI/UL 790 rating) over the volume of a foam body which could be subjected to flame spread which is typically the entire foam body. As just one example of the dispersion degree, if one were to connect the outermost points represented by the one or more reception cavities formed in the foam body, the resultant internal area would occupy 80–100% of the surface in which the reception cavities are formed. The 100% level would be reached when a series of full or partial cavities are formed in the externalmost border of a surface, while the close to or 80% valve would involve an inward spacing of the cavities from the external periphery, the flame retardant will provide a degree of protection outward of the reception cavity. That is, the inward spacing is possible from the standpoint that an attempt for a flame to initiate and continue across the body would be suppressed upon reaching an adjacent one of the preferably equally dispersed cavities.

An example of a possible single reception cavity that would cover more than a majority of a quadrilateral foam body's upper or lower surface can be seen in a spiral groove or cavity formed in that surface that radially expands outward close to or all the way to the body's periphery (e.g., from the surface's center point out to a maximum 1–5 inches internal of the body's outer periphery). A variety of different foam reception cavity patterns, including random or repetitious serial patterns, are possible for use in the present invention, although an equal dispersion (same spacing along an X and Y axis for each cavity) is preferred from the standpoint of consistent flame retardation suppression over the entire foam body. Again, the arrangement of reception cavities should be one that provides a sufficient size and distribution of cavities to allow for the providing of a sufficient amount of a desired fire retardant material to ensure that when the product is subjected to a flame, there is sufficient fire retardant distribution to protect or cover 100% of the product (e.g., to provide Class A protection from burning over the entire volume of the product within the requirement of the aforementioned ASTM 108 E Standardized Test or the aforementioned ANSI/UL790 provision). The volume of the holes or cavity is preferably minimized such that, when solid fore retardant material is utilized, the holes or cavities are filled to capacity. This also helps maintain structural integrity and strength in the final product.

Thus, subsequent to formation of the desired reception cavity arrangement, the fire retardant material is provided to the reception cavity or cavities using any appropriate technique suitable for the type of fire retardant material being provided.

As with FIG. 1, FIG. 2 shows a possible additional step (ST4) that involves encapsulating or coating the foam body with a covering or laminate which can be of a type that further increases fire resistance but need not be. The coating or covering can cover just one, a plurality of, or all exposed surfaces of the foam body.

Figure 4:
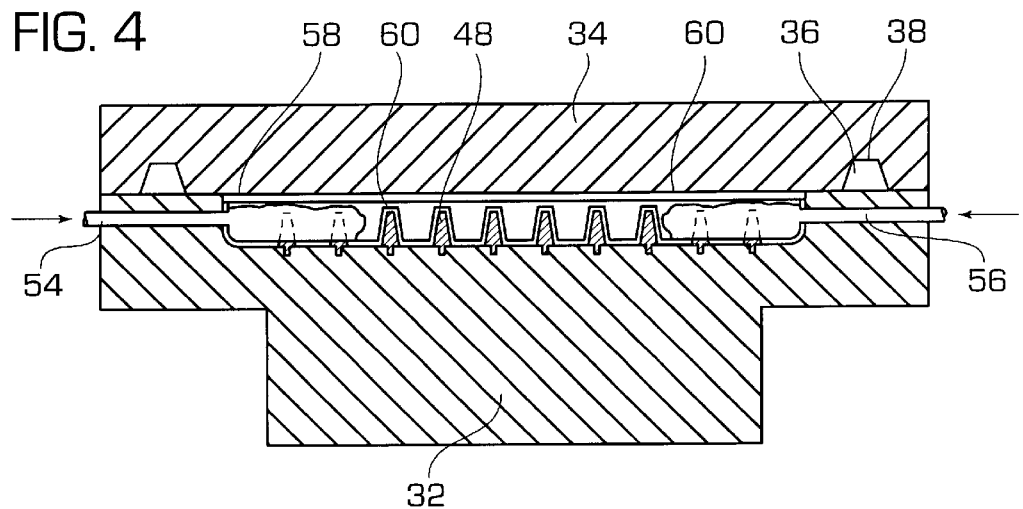
Figure 5:
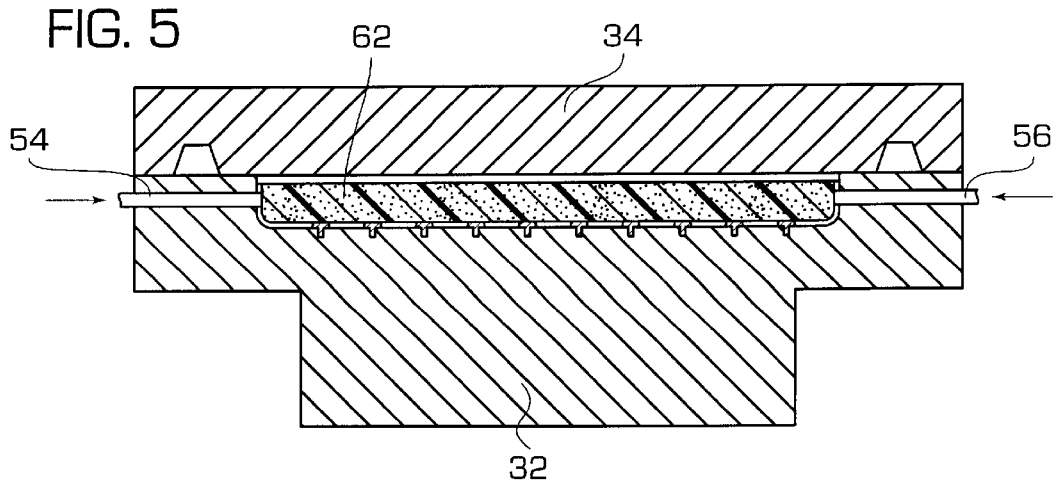

FIGS. 3–5 illustrate one embodiment of the present invention which forms a foam body commensurate with the formation of reception cavities within that foam body (see step S1 of FIG. 1). As shown in FIG. 1, foam member formation assembly 30 comprises lower mold member 32 and upper mold member 34. Although not shown, one or both of mold members 32 and 34 can be secured to a movement and pressurized chamber hold down means such as a hydraulic assembly. In a preferred embodiment the upper mold member 34 is vertically adjustable while the lower mold member 32 is fixed in position with respect to a supporting floor or the like. FIG. 3 further illustrates male alignment projections 36 and female alignment recesses 38 preferably provided at each corner of the mold assembly for facilitating proper orientation. Suitable valved venting lines can also be provided, if the manufacturing parameters require or suggest venting.

Lower mold member 32 includes mold cavity 40 having two end walls 42 (only one shown due to cross-sectional view) and two side walls 44,46 for defining the shape of the resultant foam body. While a hexahedron shaped mold cavity arrangement is represented in FIG. 3, the shape of the cavity can be any shape desired with or without contouring or texturing mold surfaces. For example, rather than the hexahedron mold cavity arrangement the cavity can be spherical, cylindrical, a product specific design (e.g., a contoured foam construction shingle), etc. Further, while lower mold member 32 is shown as having the mold cavity, either or both of the mold members 32 and 34 can have a foam product forming cavity.

For a step S1 type foam member forming assembly, one or more projections or reception cavity formation members extend into or within the mold cavity and are preferably supported by or extend off from one or both of the mold members 32, 34. In the embodiment shown in FIG. 3, projections 48 are frusto-conical in shape although numerous other shapes are possible with the only restriction being that the shape not significantly interfere with foam body separation from the mold after formation or, in other words, separation of the projections from the foam body. As made clearer below, projections 48 are arranged in a plurality of rows and columns with the outer most columns and rows spaced inward but relatively close (within 0.5–5 inches) of the side and end walls of the mold cavity and to each other so as to facilitate equal dispersion over essentially the entire exposed surface area of the foam body for internal and external flame retardant protection.

Projections 48 can be made integral with the remainder of the mold cavity defining wall(s) or detachable for easy cleaning or for providing various projection shape and size attachment options. In the embodiment shown in FIG. 3, each projection 48 has a threaded stub 50 for reception in a threaded aperture in the mold cavity's surface. Thus, while a preferred depth of the projection extension might be 80% of the foam body's receiving thickness for a particular type of foam material, a different foam material might have a preferred depth of projection extension relative to the foam body's thickness of, for example, 95%. Similarly, depending on the foam and fire retardant material being combined, one volume hole size might provide sufficient fire retardant protection as compared to a larger volume hole size that is required for a different combination of materials to meet the same fire retardant test standard.

The change in desired depth or volume can be carried out by the replacement of one set of projections with a taller, shorter, thinner or fatter set of projections. Rather than individual replacement one or more plates having a group of projections is suitable. A preferred general range of projection is 60 to 95% with the depth of projection being designed to retain structural integrity while still accomplishing a wide and thorough flame retardant material dispersion function in the foam body. From the same standpoint of maintaining structural integrity, a typical hole average diameter is ¼ to ½ inch, although the size of hole varies depending on the materials involved and the number of holes utilized. For some foam bodies, particularly laminate foam bodies or bodies having self-bonding flame retardant additives, a projection through-hole embodiment may be suitable (e.g., an increase in possible projection extension range from 60–95% to 60–100%). From the standpoint of facilitating a capturing or retention for an initial pooling or packing of the fire retardant material within the fire retardant reception cavities in the foam body, the former range of 60–95%, which provides at least one closed off end, is more preferable for non-laminate foam body structures.

Prior to introduction of the foam material, upper and lower members 32,34 are brought into contact as shown in FIG. 4 to seal off the mold cavity 42. For example, upper mold member 34 is lowered into the stationary lower mold member until contact surface 58 rests on the lower mold member. A peripheral seal arrangement can be added if desired. Extending through lower mold member 32 (and/or the upper mold member 34) is one or more foam mix (e.g., initial contact of foam mix ingredients occurring immediately before entry into the mold whether in a highly pressurized state or not) or foam precursor (e.g., initial contact of foam precursors to take place only within the mold) inlets for feeding the material required for the development of a foam body in the mold cavity 42.

In FIG. 4, two foam material inlets (54,56) are shown opening into the mold cavity. From a suitable foam mix source or sources (not shown), the material used to form the foam body is introduced through conduits 54 and 56 as depicted in FIG. 4. As also shown in FIG. 4, once the premixed, typically cream like foam material reaches the mold cavity, it begins to expand outwardly as the foam precursor reaction accelerates to fill up the mold cavity space. Alternatively, each of the foam material conduits can introduce a foam precursor liquid which mixes for the first time with the other foam precursor within the cavity. As is known in the art a suitable coating material 60 can be applied over the foam contacting surface of the mold cavity to facilitate removal or the applied material can be material to form an outer coating simultaneously with the foam body formation ( e.g. sand or glass fibers exterior coating). The coating 60 is shown in FIG. 4 to cover the mold cavity's exterior walls as well as projections 48 extending within the mold cavity 42. The projections 48 can, however, be free of coating material so that the added fire retardant material makes direct contact with the set-up foam body material.

Any suitable foam material can be used in the context of the present invention such as foamed plastics materials. As just a few examples of suitable foamed plastics material, there can be used polyurethane, polyisocyanurate, polyuria, polyolefin, polystyrene, phenol-formaldehyde, epoxy and other polymeric foams either rigid, semi-rigid or flexible and either closed cell, open celled or a combination thereof.

Taking polyisocyanurate as an example, there is mixed an organic plyisocyanate, an active hydrogen containing compound and a blowing agent such as water and additional conventional additives such as UV protection and color retention additives. Unlike many prior art products, a flame retardant additive need not be added to the precursors to be used in forming the foam due to the post formation dispersion of fire retardant material under the methods of the present invention. While the inclusion of flame retardant ingredients in with the original precursors is considered unnecessary under the present invention, the present invention includes, nonetheless, the possibility of including a flame retardant additive in the initial mix that is supplemented by the addition of additional flame retardant material following foam set up as earlier described, and as described further below. Under the arrangement of the present invention the post set up dispersion technique is adequate to reach a desired high level of flame resistance in the foam material forming the product or at least a component of the manufactured product. Also, for those situations where flame retardant material is included in with the initial material to be cured, it can be introduced in much lower quantities under the present invention so as to promote proper set up.

FIG. 5 shows a similar view to that of FIG. 4 except that the crosssectional view through the foam body is in between rows of the projection rather than through one row of projections. Thus, the cross-section of foam body is uninterrupted across its width in FIG. 4. FIG. 5 further illustrates the foam body having set up to the desired shape or essentially to the desired shape taking into consideration some minor shrinkage possibilities in the final stages of set up.

Figure 6:
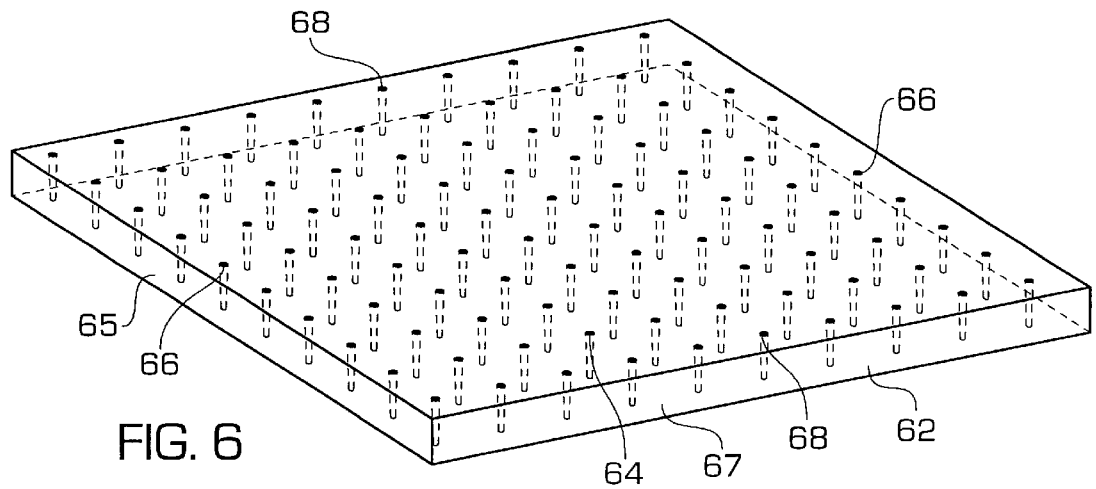
FIG. 6 shows a schematic, perspective view of the foam body produced by, for example, the mold assembly of FIG. 5 with the tapered or conical cavities formed in the molding process shown in full detail to facilitate an understanding of their shape and location in the foam body.

FIG. 6 shows, in somewhat schematic fashion, fire retardant reception cavities 64 which are produced by projections 48 in the molding process described above for FIGS. 3–6 (or by some other technique such as a post set up drilling operation). While the present invention is directed at a wide variety of reception cavity shapes, sizes and distributions and not meant to be in any way limited to the illustrated or described arrangements, the frusto-conical reception cavities shown in FIG. 6 are arranged in equally spaced rows 66 and columns 68 due to the corresponding positioning of projections 48. This arrangement can be seen in the top plan view of FIG. 7. Also, a suitable diameter range for the largest openings of the cavities is dependent on the foam material and foam body dimension, but a range of ³⁄₁₆ to ⅛ of an inch is considered a typical range under the present invention. The preferred radial distance from the center of a central projection out to an adjacent one of a plurality of surrounding projections is also dependent on the foam body size and material, but is preferably about 1 to 1¼ inch for the noted reception cavity diameter range set forth above as being a typical range. The radial distance is the same as the spacing both between adjacent rows (d1) and between adjacent projections (d2) in a common row. The illustrated embodiment has d1=d2=1 inch. The sides and length of the foam body are represented by sides 65 and sides 67 with the distance D from an outer most cavity to an adjacent side being equal to about (d1)/2.

Figure 7:
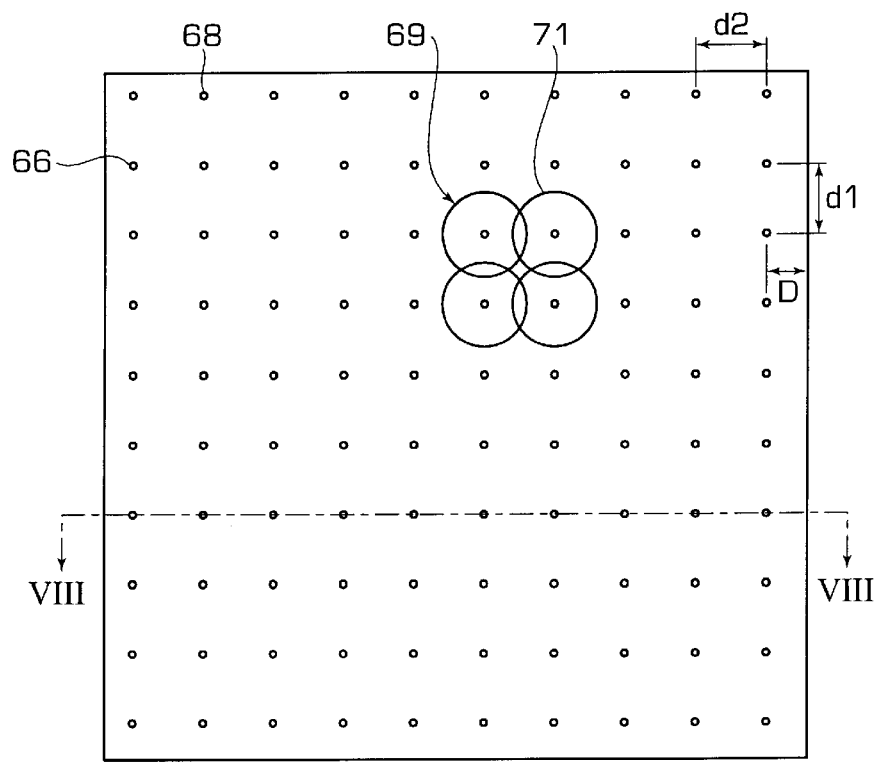
FIG. 7 shows a top plan view of FIG. 6.
Figure 8:
FIG. 8 shows a cross-sectional view taken along cross-section line VIII—VIII in FIG. 7.

FIG. 8 illustrates a cross-sectional view taken along cross-section line VIII—VIII in FIG. 7. As illustrated in FIG. 8, the reception cavities are frusto-conical in shape like the projections 48 and extend deeply into the foam body 63. Cavities 64 also feature an open maximum diameter upper opening 70 and a smaller diameter closed end 72. The depth d3 of the cavities is, in this particular embodiment, about 80% of the total thickness "t" of the foam body. The thickness "t" being ³⁄₁₆ to ¹⁰⁄₁₆ of an inch in the illustrated embodiment. The depth can vary depending on the shape of the cavity, the foam material, the foam material thickness, and the fire retardant material involved. The goal being to provide a minimum, sufficient depth to achieve dispersion of the fire retardant over a sufficient volume of the foam body to meet the desired fire retardant level (such as the ANSI/UL 790 standard set out below) while avoiding a waste of retardant. The range of depth again varies depending upon the above noted factors, but a range commensurate with the above described 60–95% or 60–100% range of the projection or projections is preferred, although for very thin foam bodies or particular types of foams and/or retardants, a 25% or greater depth may be a more applicable range. Again, the goal is to provide overall coverage throughout the volume of the foam body such that no particular section is prone to failing a test which the other sections of the foam body can pass.

While not intending to limit the present invention to any particular fire retardant material, suitable materials include those described in the background portion of the present invention, as well as other materials such as ammonium sulfate and mono ammonium phosphate.

Figure 9:
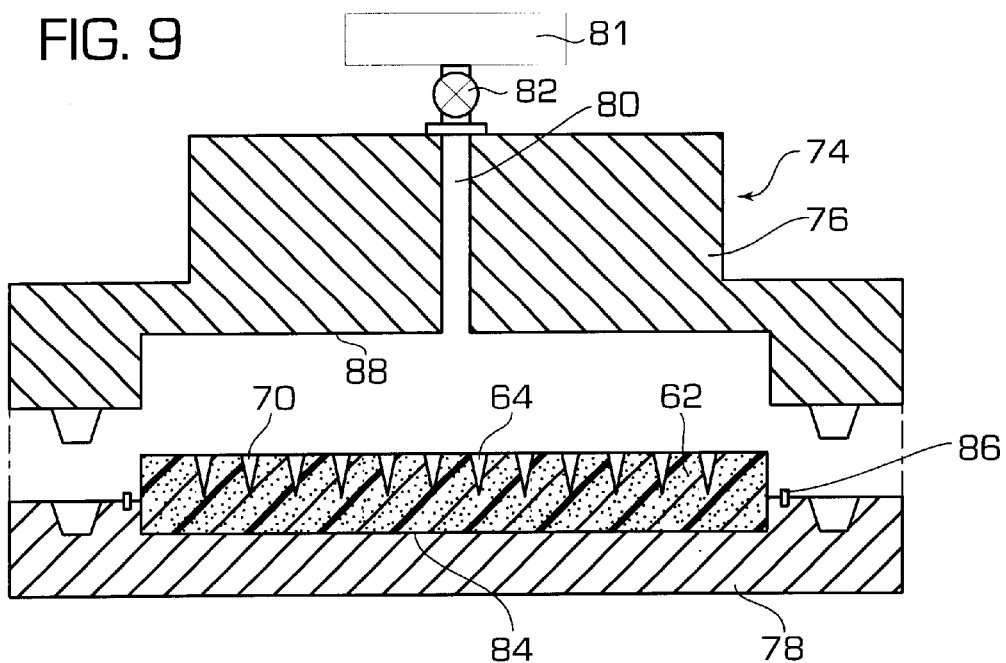
FIG. 9 shows a cross-sectional view of one embodiment of a fire retardant or resistant dispersion assembly in an open state with the foam body of FIG. 7 in position within the dispersion assembly.
Figure 10:
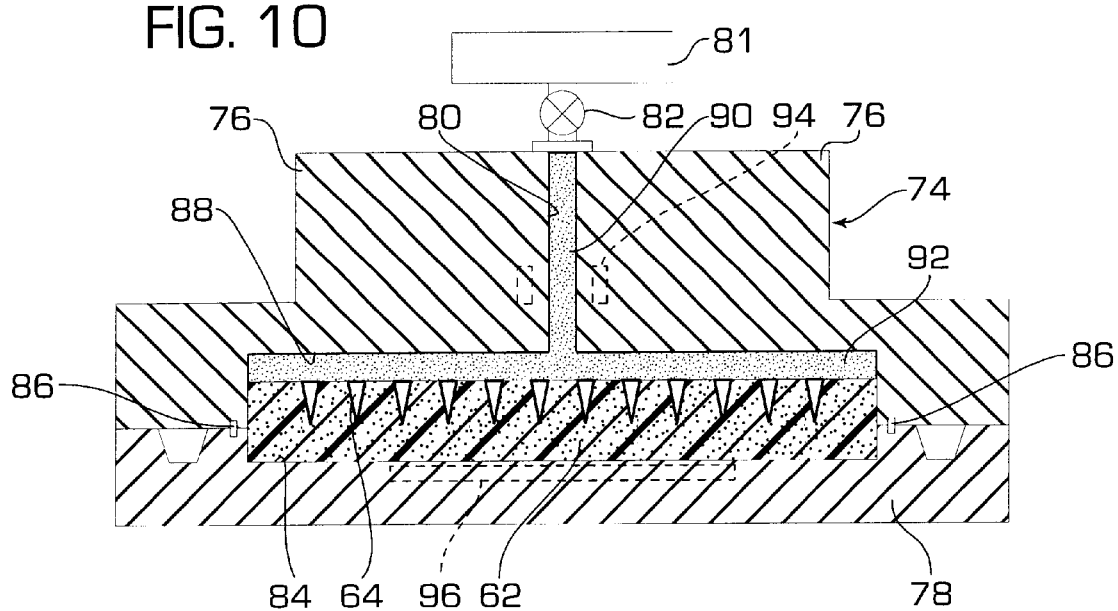
FIG. 10 shows the dispersion assembly of FIG. 9 in a closed state and with fire retardant material being applied to the foam body.

While the supply of flame retardant to the apertures can be carried out in a number of ways, FIGS. 9 and 10 illustrate an embodiment of fire retardant dispersion assembly 74 in an open state and following insertion of foam body 62 with open end 70 of cavities 64 facing upward. Dispersion assembly 74 includes an upper component 76 and a lower component 78 having a general arrangement sharing some similarities with the previously described molding assembly. Upper component 76 includes one or more fire retardant passageways 80 in communication with a fire retardant material source 81 such as a fluid container which is also in communication with a pump (not shown) or is pressurized internally. On/off valve 82 is in line with a conduit extending from source 81. While a single source and single passageway 80 is illustrated in FIG. 9 any suitable fire retardant supply arrangement can be utilized including, for example, multiple sources linked to multiple passageways extending through either or both of components 76 and 78 or one or more manifold like passageways distributed through the dispersion assembly are a suitable arrangement for the present invention.

Bottom component 78 features positioning depression 84 which is preferably sized to match the periphery of foam body 62 in a contacting manner (or slightly larger,—e.g., less than 2 inches, to allow for the external side wall(s) of foam body 72 to be in better contact with the supplied fire retardant material). In one of components 76 and 78 there is provided a peripheral seal 86 for sealing in the supplied fire retardant fluid (liquid, gas, or suspended solid). Suitable venting and exit lines (not shown) can also be added for removal or a recycling application process.

Upper component 76 includes central depression 88 that has a periphery corresponding to that of depression 84 in the lower component which in this case is essentially the same as the periphery of foam body 62. Flame retardant passageway 80 opens into depression 88 as shown in FIG. 9.

FIG. 10 shows dispersion assembly 74 in a closed state about foam body 62 wherein seal 86 is compressed between the two contacting components 76,78 and the alignment tabs are received in the corresponding alignment apertures. Also, FIG. 10 shows fire retardant material (e.g., a liquid suspension) 90 passing from source 81, through passageway 80, and into distribution chamber 92. Distribution chamber 92 is formed between the upper surface of foam body 62 and the upper depression defining wall of the upper component. While only one passageway is shown, a number of passageways can be relied upon to facilitate an equal disbursement over the exposed and apertured surface of the foam body. This can take the form of one or more sources with an internal manifold arrangement or a plurality of unconnected passageways leading from individual retardant sources or one or more shared sources, or one or more nozzles (e.g., spray) positioned above the exposed cavities.

FIG. 10 also illustrates wrap around heating unit 94 extending around passageway 80. This heating unit can be used to convert a liquid suspension into more of a gaseous suspension to facilitate dispersion depending upon the foam material, pressure, and retardant involved, for instance. Heater 96 can be used to facilitate a complete setting or curing of the foam body prior to fire retardant application and/or an evaporation of a liquid having a solid fire retardant suspension. Depending on the foam material and fire retardant material involved, the fire retardant material can be applied as a thin coating over the upper surface and aperture surfaces or caused to pool up and dry in the reception cavity for later encapsulation or in a surrounding area due to partial absorption by the foam body (particularly an open cell foam body).

As shown in FIG. 10, the retardant (e.g., liquid, liquid suspension, gaseous, gaseous suspension of solid particles, viscus gel, etc.) travels into the dispersion cavities 64 formed in the set foam of foam body 62, whereupon it disperses due to the pressure and/or gravity and/or capillary action into the apertures in the foam body 62. A gas flush system or like arrangement can also be provided to remove or recycle any excess after a sufficient period of time for distribution is provided.

FIG. 7 illustrates for one embodiment, that the size and distribution of the flame retardant apertures, coupled with the amount and type of flame retardant provided to the apertures, is sufficient to provide a zone of flame retardant protection which protects (effectively) 100% of the foam body from failing to meet certain fire retardancy test requirements such as those noted above in this application. The reception cavities are distributed over essentially the entire exposed surface 69 of the foam body such that each of zones 71 provides flame retardancy coverage in the interior and external border region of the foam body from the standpoint that the fire retardant material is able to prevent flame spread despite there being regions between the cavities free of the flame retardant material (e.g., the radius of the circles defining protection zone 71 is preferably about equal to dimension "D" or greater than dimension "D" for some overlap in the relative protective area as shown in FIG. 7).

Figure 11:
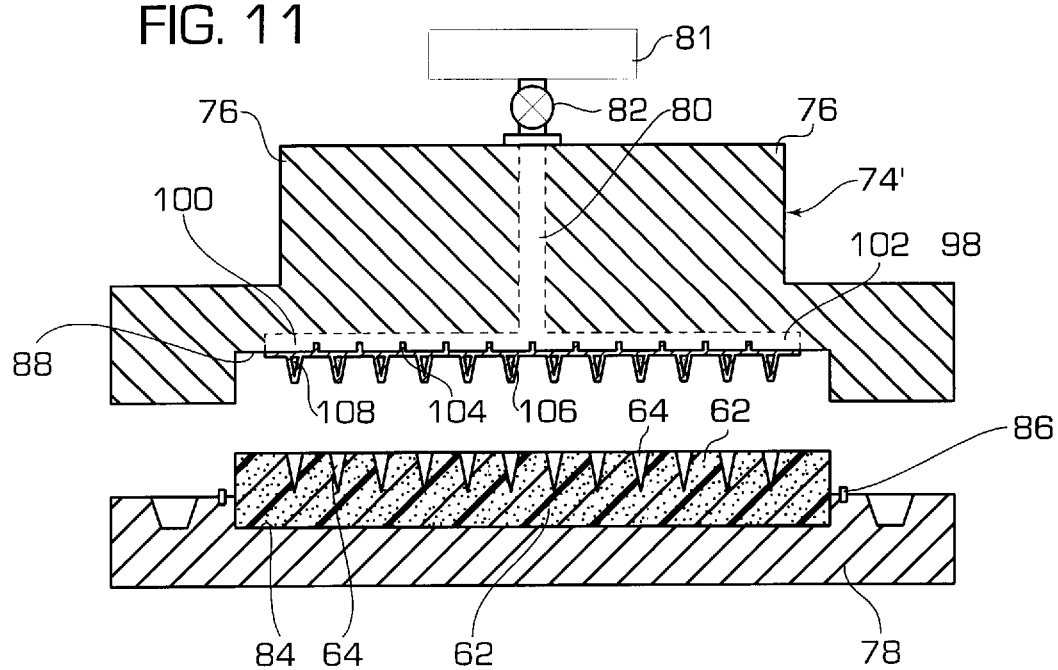
FIG. 11 shows an alternate embodiment of the dispersion assembly of FIG. 10 with fire retardant directing nozzles and with the dispersion assembly in an open state as in FIG. 9.

FIG. 11 shows another embodiment of a flame retardant dispersion assembly 74' which is similar to the FIG. 9 embodiment except for the presence of nozzle flame retardant feed assembly 98. In the embodiment of FIG. 11 the flame retardant material is fed through passageway 80 into distribution chamber 100 formed between wall 102 of upper component 76 and distribution plate 104. Plate 104 preferably includes a plurality of distribution channel members which help channel flame retardant material to nozzles 106. Nozzles 106 include one or more outlet ports 108 which extend radially and/or axially with respect to the nozzle (e.g., a downward port and two pairs of diametrically opposed side outlet ports 90° offset from each other).

Figure 12:
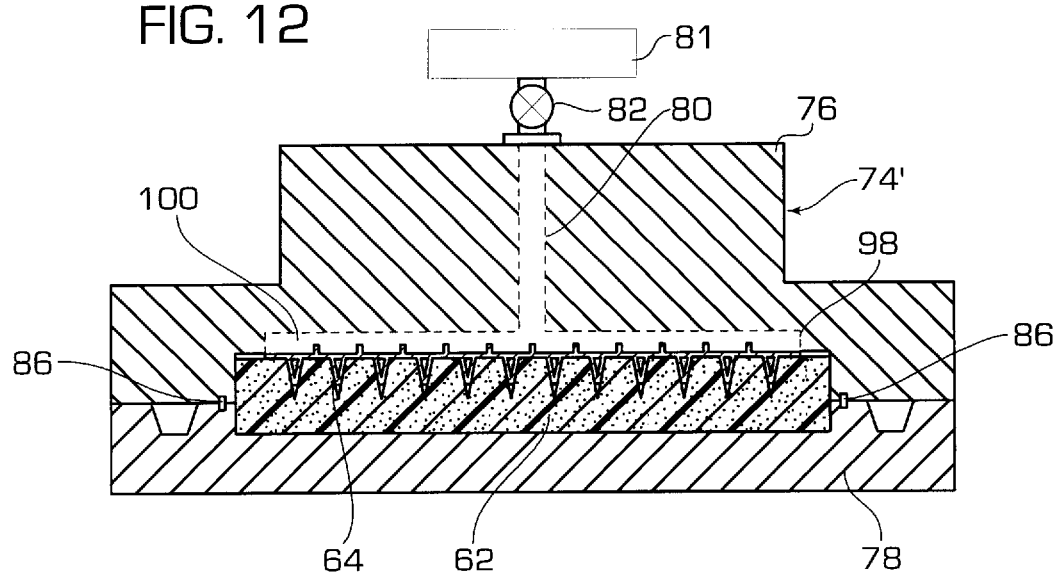
FIG. 12 shows the embodiment of FIG. 11 in a closed state.

FIG. 12 shows a view similar to FIG. 11 except with upper and lower components 76,78 in a sealed state. When components 76 and 78 are in a sealed state, nozzles 106 extend into or just above (e.g., within an inch of) dispersion cavities. Each nozzle 106 is generally in a similar shape to the retardant cavity that is receiving the nozzle and preferably extends somewhat into the cavities to avoid significant spray escaping (when a liquid is involved) and to provide for initial pooling or building up in the bottom of each cavity of flame retardant material when such pooling or building up is desired. The outlet ports 106 can be provided with a shape (e.g, divergent in the direction of flame retardant passage out of outlet port 106 to create a spray effect. With certain types of foam (material such as highly flexible, non-rigid foam bodies), reception cavities in the form of slits can be cut into the foam body rather than cut-out cavities like the cut-out, frusto-conical reception cavities shown, and the nozzles inserted into the slit cavities upon deflection of the side walls defining the slit. A hydraulic arrangement or the like can be provided to gradually shift exit nozzles upward for those situations where a full filling of the cavities with flame retardant is desired (e.g., a foam type retardant which dries either before or after being encapsulated by a coating). Also, while the nozzles can be used as part of a gas/solid suspension distributor arrangement (e.g., with a filtered vent arrangement provided—not shown), the nozzles can be formed to have open ends and appropriate solid distribution channels or chutes with vibration means (not shown) or the like to avoid a blockage during the direct feed of solid particles to the flame retardant reception cavities. Alternatively, nozzle use can be avoided and reliance placed simply on an overhanging plate or the like with opening coinciding with the cavities. In these ways, the cavities can be directly filled to the upper surface of the foam body with powder or granular or tablet form fire retardant material.

The foregoing illustrations of assemblies for providing flame retardant to the foam body with one or more reception cavities formed therein represents just a few of the numerous techniques that can be used to supply flame retardant to the one or more reception cavities.

Thus, under the present invention, a roof covering material can be formed which is highly fire resistant to the extent that it satisfies the Class A standard of ASTM E 108 90 by satisfying the following criteria:

(I) At no time during or after the intermittent flame, spread of flame, or burning brand tests shall;
   (a) any portion of the roof covering material be blown or fall off the test deck in the form of flaming or glowing brands that continue to glow after reaching the floor, or
   (b) the roof deck be exposed, or
   (c) portions of the roof deck fall away in the form of particles that continue to glow after reaching the flow.

(II) At no time during the intermittent flame or burning brand tests shall there be sustained flaming of the underside of the deck.

(III) During a spread of flame tests, the flaming shall not spread beyond 6 ft. (1.8 m) for Class A, 8 ft. (2.4 m) for Class B, nor 13 ft. (4.0 m) (the top of the deck) for Class C. There shall also be no significant lateral spread of flame from the path directly exposed to the test flame.

(IV) In a flying brand test, no flying, flaming brands nor particles that continue to glow after reaching the ground may be produced.

Figure 13:
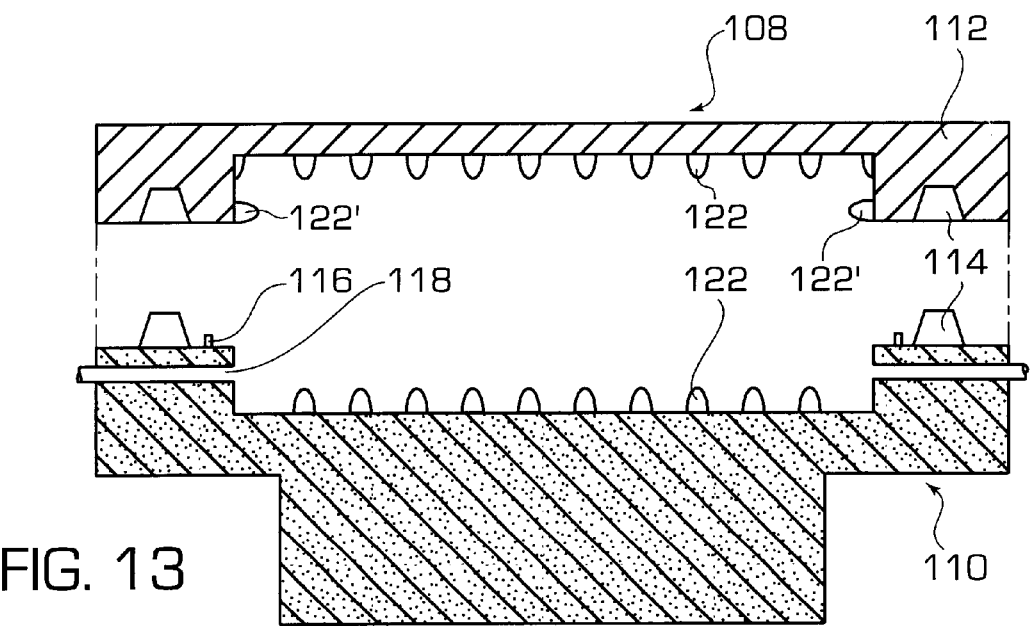
FIG. 13 shows an embodiment of a combination molding and flame retardant reception cavity forming assembly in an open state.
Figure 14:
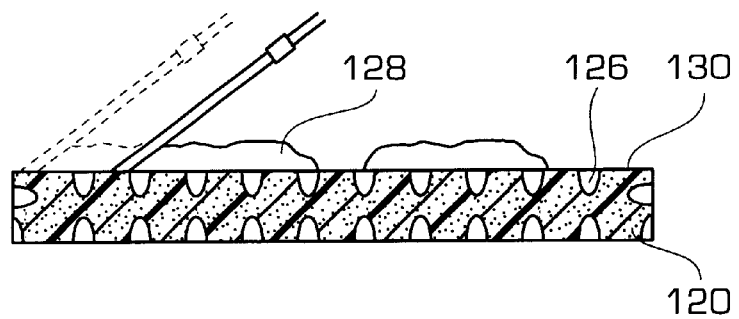
FIG. 14 shows a cross-sectional view of a foam body produced by the assembly in FIG. 13 with a fire retardant application illustrated.
Figure 15:
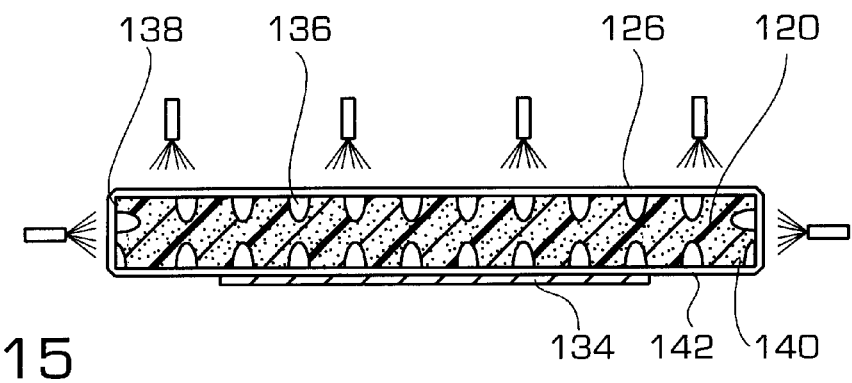
FIG. 15 shows the foam body of FIG. 14 subjected to an added coating procedure.

FIGS. 13–15 are directed at an alternate arrangement of the present invention wherein flame retardant cavities are formed over multiple (all in this case) exposed surfaces of the foam body and with the depth being generally less than that of the above-described embodiments due in part to the presence of cavities on opposite surfaces in staggered fashion and in the average diameter being greater such that the holes hold sufficient enough volume of flame retardant, despite the lower depth. A comparison of this embodiment shows that the number, arrangement, shape and positioning of the holes is variable to accommodate the goal of providing the minimum amount of flame retardant material needed to provide full protection in the foam body from a flame spread suppression and fire resistance standpoint such as to the extent of passing, for example, the aforementioned ANSI/UL 790 developmental spread of flame test coverings for roof material which requires maintaining a maximum flame spread of 6 ft. or below, and having no lateral flame spread or flaming brands production.

FIG. 13 illustrates one embodiment of a combination foam body mold and fire retardant cavity formation 108 assembly with lower formation component 110 and upper formation 112 component. As with the molding assembly shown in FIGS. 3–5, upper component 108 is brought into aligned contact through alignment projection/recess combination 114 upon upper component 112 being lowered into a resting position on lower component 110. Peripheral seal 116 seals off the mold cavity and the foam material is introduced through one or more foam material inlet conduits 118 into the mold cavity formed once upper component 108 is moved into its lowered molding position. Both lower component 110 and upper component 112 of feature a plurality of flame retardant cavity projection formations 122 which can include horizontally extending side projections 122' (provided shaped for relatively easy withdrawal of the foam body without damage or provided horizontally shifting hold side walls).

FIG. 14 shows a cross-sectional view of foam body 120 formed with assembly 108 in FIG. 13. Foam body 120 includes main body 124 and flame retardant reception cavities 126, which are formed on all six of its exposed surface (only four surfaces shown in FIG. 14). FIG. 14 further shows one example of the numerous fire retardant material application techniques possible under the present invention with the preferred technique being heavily dependent on the type of foam material involved (e.g., a rigid, denser plastic foam body versus a highly compressible, flexible plastic foam body) and the type of flame retardant material used both in type and form such as a liquid, paste or gel or powdered or granulated solid). FIG. 14 is illustrative of a foam body falling within the dense, rigid or not appreciably flexible range with the flame retardant 128 being in a paste or gel form.

As shown in FIG. 14, flame retardant paste 128 is supplied to surface 130 in a plurality of dispersed piles over the exposed surface of foam body 120 within which cavities 126 are formed. Flexible paddle board 132 is then drawn along surface 130 to cause the piles to shift and fill in cavities 126 with the fire retardant paste or gel 128. The application of the flame retardant material and spreading of the same into the cavities can be carried out by hand or in an automated process with the flame retardant paste preferably retaining position within the cavity while the other exposed surfaces have their cavities later or simultaneously filled and/or an outer encapsulating coating is applied between exposed surface fill completion.

FIG. 15 shows foam body 120 with flame retardant filled cavities 126 being subjected to an encapsulation process wherein foam body 120 is conveyed by conveyor 134 through an encapsulation stage wherein upper coating 136 and side coatings 138, 140 are formed with suitably positioned outer coating sprayers which can supply any suitable encapsulating layer material such as another foam or non-foam material. Bottom coating 142 can be formed in an upstream step for the automated or, alternatively, the entire foam body can be subjected to a dipping process or conveyed in a fashion that involves only minimal point contact so as to allow for a contemporaneous all surface spray coating step, or a subsequent mold operation can be performed, etc. Alternatively, the foam body with, for example, granular flame retardant adhered in position, can be wrapped or otherwise covered with an outer covering (e.g., a flexible cushion cover).

Figure 16:
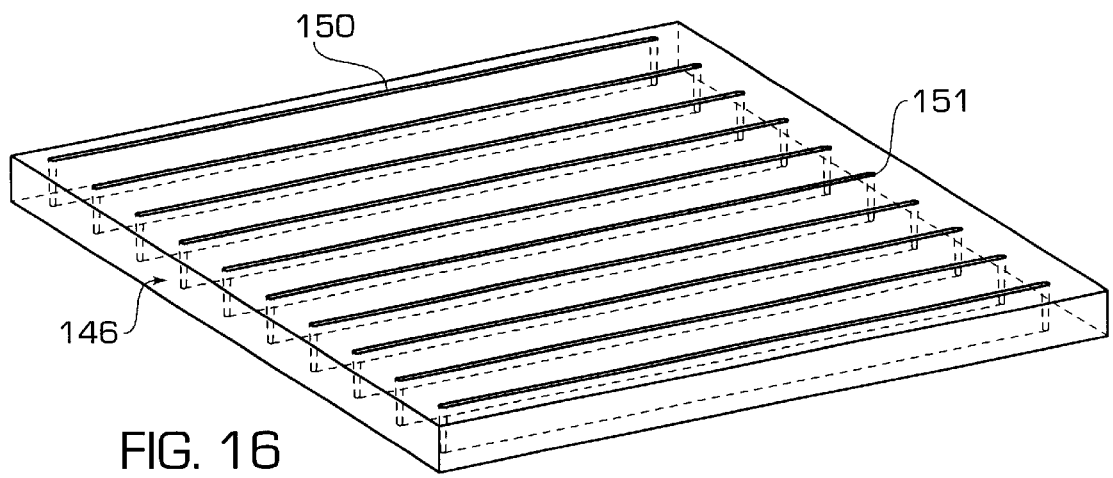
FIG. 16 shows a perspective view of an alternate foam body embodiment of the present invention having a plurality of grooves formed in the foam body by way of a molding process or some other cavity forming process.

FIG. 16 illustrates a perspective, somewhat schematic view of an alternate embodiment of the present invention with foam body 146 formed with an equally spaced series of grooves 150 as flame retardant reception cavities. In FIG. 16 grooves 150 are shown in full detail despite being embedded in the interior of the foam body. Grooves 150 can be easily formed in either a molding operation as described above wherein elongated mold cavity projections are provided or in a post foam body formation groove or recess formation technique such as a cutting operation wherein one or more cutting blades or units (e.g., high speed grinding) travel along the exposed surface of foam body 148. The ends 151 of grooves 150 preferably extend just short of adjacent peripheral border edges 152 (e.g., ¹⁄₁₆ to 5 inches inwardly from the border edges), while the sides 153 of grooves 150 are spaced from each other along surface 148, a distance which takes into account the size or volume of the cavities, the fire retardant material being utilized, and the foam material of the foam body in providing sufficient enough material to achieve a flame spread prevention capability over the entire foam body (e.g., a Class A designation under ANSI/UL 790). For many foam materials and flame retardants to be used in the present invention, a side to side groove spacing of 0.5 to 5 inches is representative of a suitable spacing.

Figure 17:
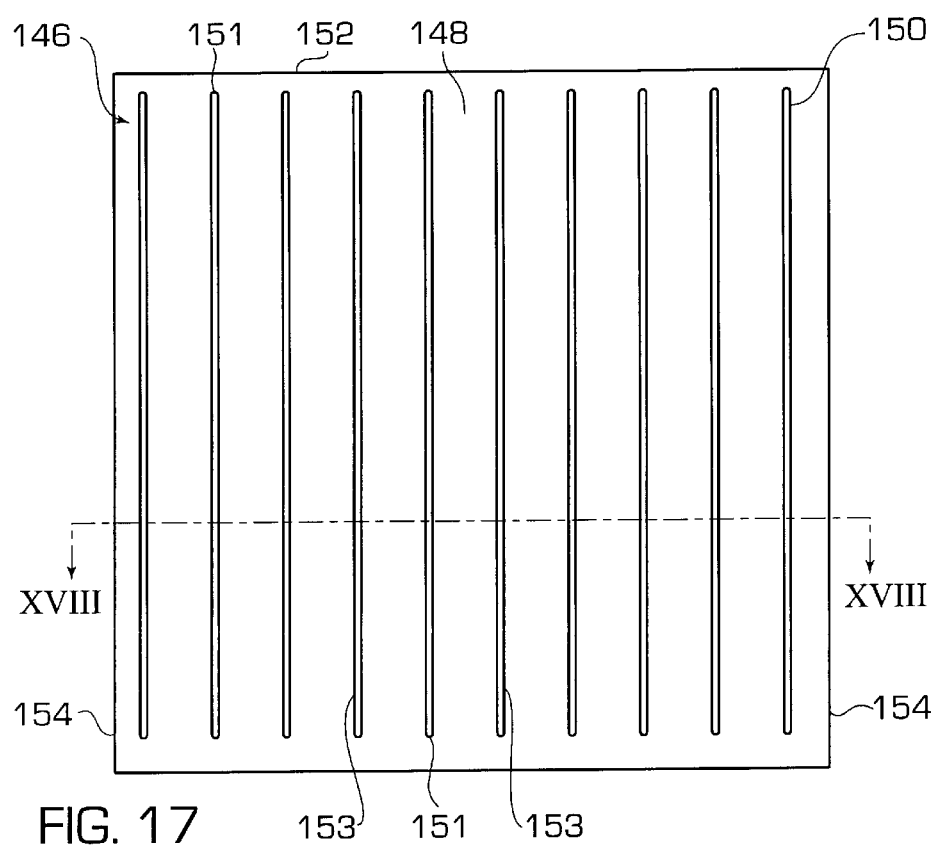
FIG. 17 shows a top, plan view of the embodiment of FIG. 16.
Figure 18:
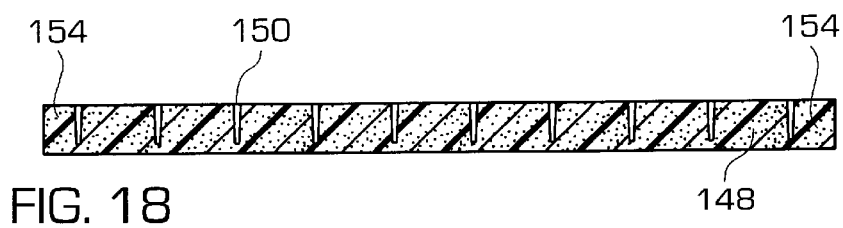
FIG. 18 shows a cross-sectional view taken along cross-section line XVIII—XVIII in FIG. 17.

The distance between the border edges and sides of grooves 150 is preferably similar to the spacing of ends 151 from an adjacent border. The depth of extension is preferably similar to the range described above for the frusto-conical projections 48. Groove ends 151 terminate short of sides 152 for reasons such as enhancing structural integrity, avoiding exposed cavities in the foam body and providing for a flame retardant material collection effect. However, in certain applications, such as certain laminate embodiments, grooves 150 can extend from one peripheral side 152 to the opposite peripheral side 152. Also, as shown in FIG. 18, grooves 150 preferably have a slight taper in the interior side surfaces defining the grooves (e.g., 1–15° from the vertical). While the groove dimensions and spacing are variable depending on the circumstances, in the embodiment shown in FIGS. 16–18, the grooves have a maximum width at the upper open end of ¼ inch, a side to side spacing of 1 inch, a side wall taper of 2°, ends spaced inwardly by ¹⁄₁₆ inches, and a depth of 50% to 60% in a ⅝ inch thick foam body 148 having equal side walls of 12 inches in length.

Figure 19:
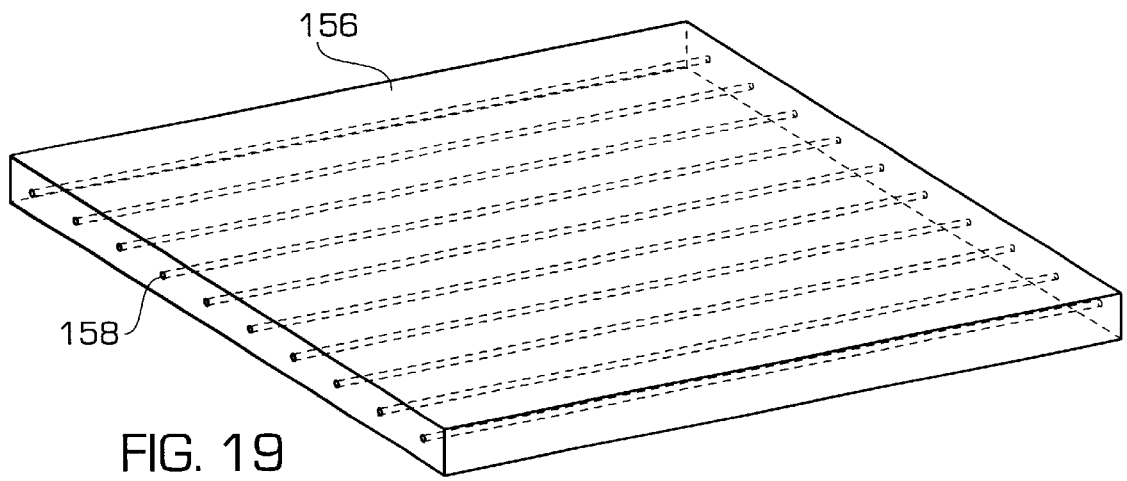
FIG. 19 shows a perspective, schematic view of another preferred foam body embodiment of the present invention.
Figure 20:
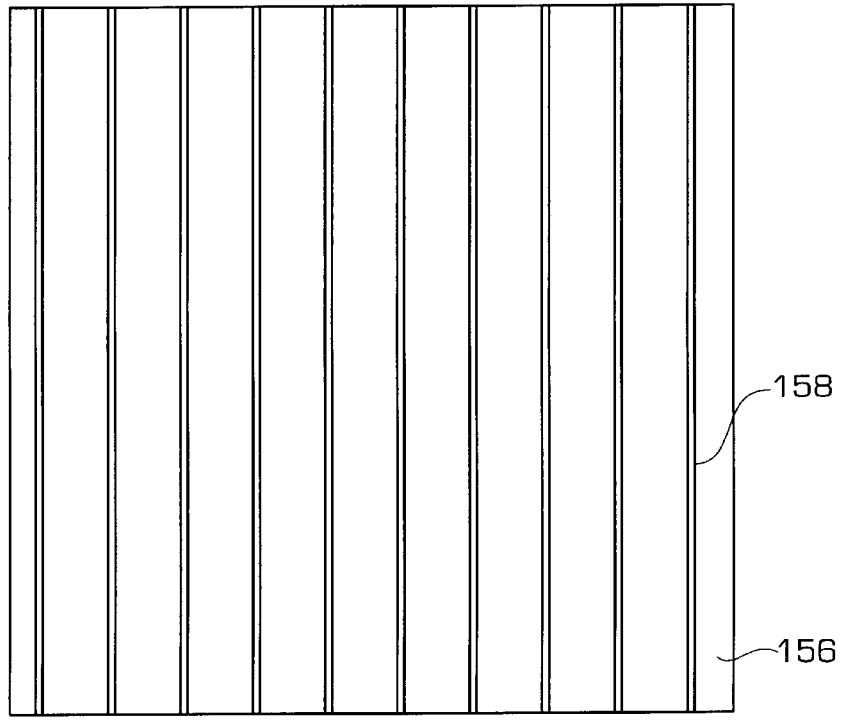
FIG. 20 shows a top plan, schematic view of that which is shown in FIG. 19.
Figure 21:
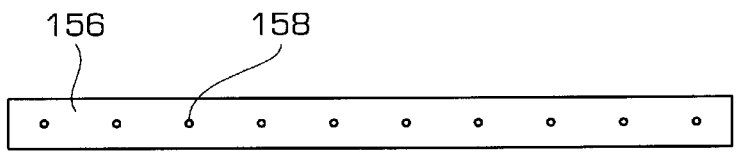
FIG. 21 shows a side elevational view of that which is shown in FIG. 20.

FIGS. 19–21 illustrate an additional embodiment of the present invention wherein foam body 156 includes a plurality of internalized flame retardant cavities 158, which, in this embodiment, are cylindrical in cross-section. FIGS. 19 and 20 show cavities 158 in schematic fashion such that they can be viewed although they are internalized within foam body 156, as shown in FIG. 21. In a preferred embodiment, internalized flame retardant cavities 158 are at an intermediate level in foam body 156. The side to side spacing and the diameter of cavities 158 are variable depending upon the variable factors described above such as foam type and flame retardant material utilized. In one embodiment, for a ¾ inch thick foam body of EPS and urethane+PPO+EPO+PE+PP foam material, cylindrical cavities of ¼ to ½ inch diameter for receiving pelletized flame retardants such as those made available by Anzon Inc. of Philadelphia, Pa., with pelletized-type retardant material, a cavity side to cavity side spacing of ⅝ to 1 inch is preferable. Cavities 158 open out at the opposite ends of foam body 156 although suitable plugs such as of the same foam material can be added to plug one or both open ends of a cavity 158 or one length made not to reach the opposing side. For example, a first set of plugs can be provided at one end and a suitable nozzle member inserted into the remaining open end wherein flame retardant is inserted (either with the foam body in a vertical, plugged end down orientation or a horizontal orientation). Particularly in the horizontal orientation, to help in facilitating equal dispersion, an elongated tubular nozzle (not shown) with a plurality of axially and circumferentially spaced openings in the tubular nozzle if liquid is involved, for example, can be inserted for, preferably, the whole length of the flame retardant cavity or within one inch or two of the whole length, whereupon flame retardant is ejected through the spaced nozzle openings. As another one of the many possible techniques, a pressurized foam fire retardant suspension can be shot into the opening and allowed to expand to fill the cavities. Another example would be to use a vertically oriented foam body and rely on gravity feeding alone or in combination with a positive feed nozzle assembly or the like. If liquid flame retardant is being used it can be introduced at the top and allowed to disperse with or without pressurization of the liquid within the cavities. If powder flame retardant is to be used, it can be poured in while the foam body is in a vertical orientation and possibly with the assistance of a vibration device. To lessen the blockage and air borne loss involved with a powder flame retardant, flame retardant formed in a granulated or tablet formed can be utilized such that the solid tablets can be readily poured into the cavities (e.g., tablets having 2–10 mm average diameter or width).

Figure 22:
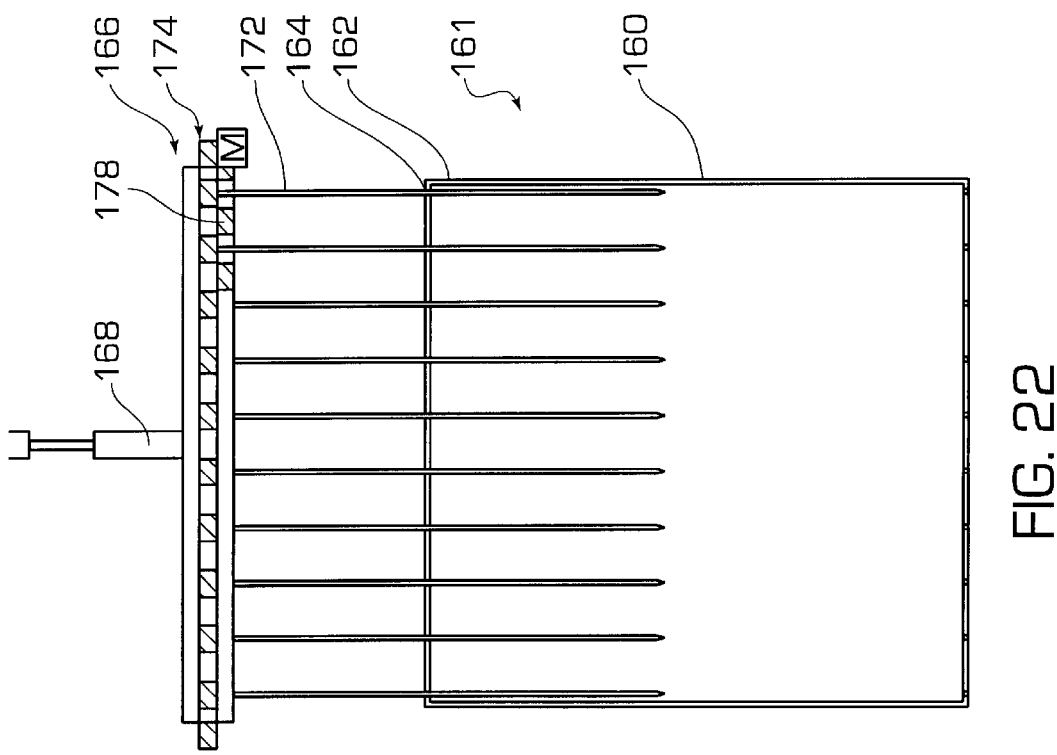
FIG. 22 shows a drilling or boring assembly which provides one means for forming the fire retardant cavities in the foam body shown in FIG. 20.

The embodiment of FIGS. 19–21 is preferably formed either by way of a drilling operation or by way of a molding operation. FIG. 22 shows one embodiment of a drilling assembly 161 for forming cavities 158 in a foam body. FIG. 22 includes peripheral frame structure 160 having one side wall 162 with a plurality of drill bit reception openings 164 formed along its length at equal intervals conforming to the desired spacing of cavities 158 in the foam body 156 (e.g., ½ to 1½ inch spacings). Frame structure 160 can receive a foam body from an earlier used molding assembly or, with suitable blocking mechanism(s) such as a sliding plate or threaded plugs, one of the two brought together molding cavity components can function as the periphery frame structure 160. Drilling assembly 161 also includes drill system 166 having forward and backward movement system 168 (e.g., a hydraulic telescoping assembly), support structure 170, drill bits 172, and drill rotation drive assembly 174. In the illustrated embodiment, drive assembly 174 includes Motor M drivingly coupled to threaded shaft 176 which, in turn, is drivingly connected to worm gears 178 fixed to the ends of drill bits 172 that are supported by bearings 178 in support structure 170. Thus, in operation, foam body 156 is placed or present in peripheral frame structure and drill assembly is shifted forward by system 168 while Motor M rotates the drill bits to form flame retardant reception cavities 158 in the foam body.

Figure 23:
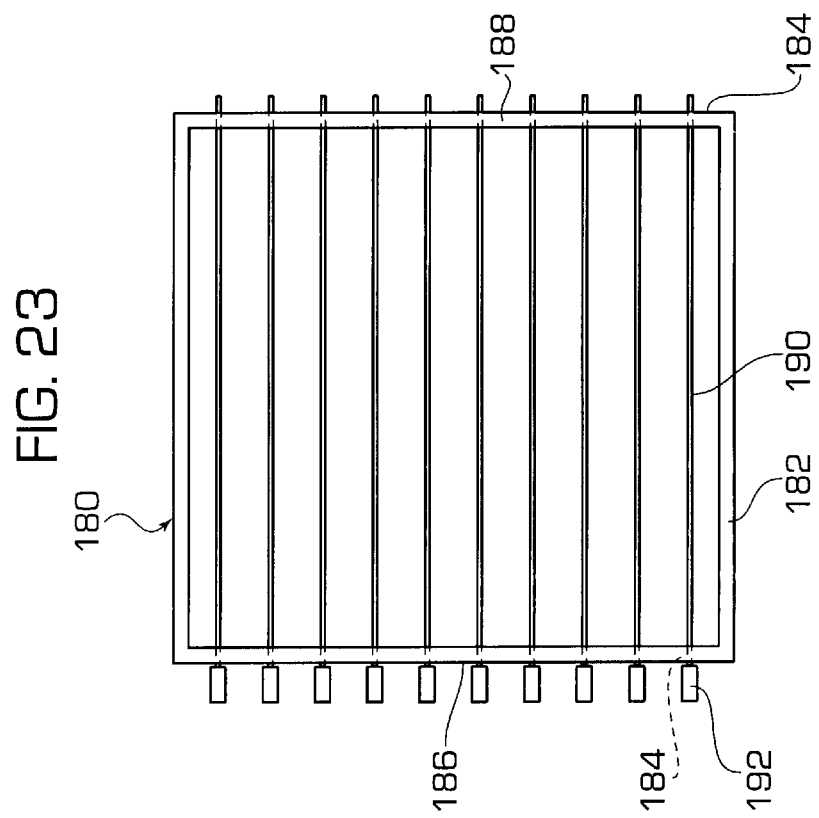
FIG. 23 shows the bottom half of a molding assembly which illustrates an alternate means for forming the dispersion cavities in the resultant foam body.

FIG. 23 illustrates an alternate embodiment 180 for forming cavities 158 in foam body 156 (FIG. 19). In this embodiment, a bottom component mold cavity segment 182 is provided with a plurality of aligned holes 184 on opposite side walls 186, 188 of mold cavity segment 182. Within the aligned holes are a series of sliding rods 190 which are inserted through suitable sealing bearing areas surrounding holes 184 to prevent unwanted foam build-up external to the mold cavity. Rods 190 have handles 192 to facilitate insertion and retraction of the rods.

In use, rods 190 are slid into place while the mold cavity is empty and coated with a suitable material to facilitate withdrawal after foam set up. Once properly inserted, the foam material is introduced into the cavity and allowed to set. After setting up, the rods are slid out (or rotated first to facilitate bond breakage) so as to form flame retardant reception areas 158 in the formed foam body 156.

Figure 24:
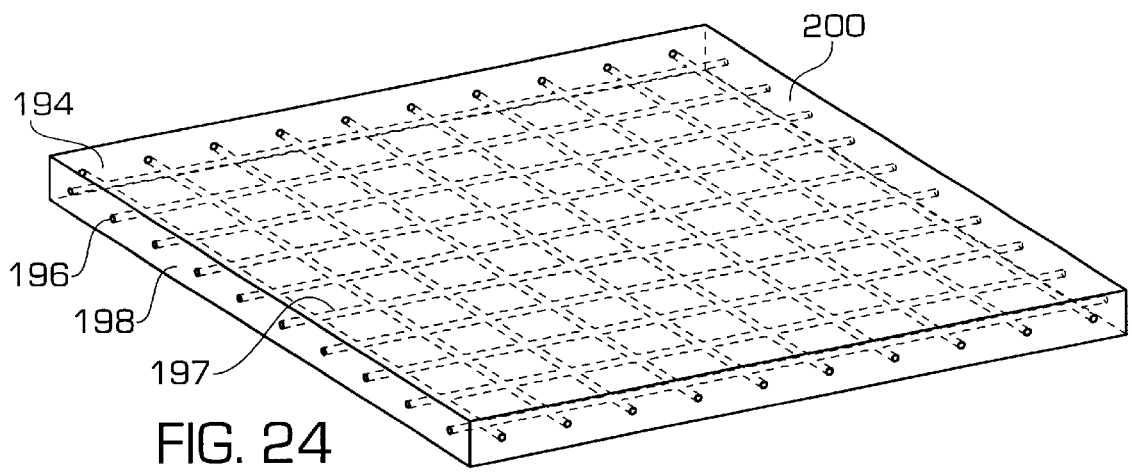
FIGS. 24–26 show views similar to those of FIGS. 19–21 above except that both longitudinal and lateral dispersion cavities are formed in the embodiment of FIGS. 24–26.
Figure 25:
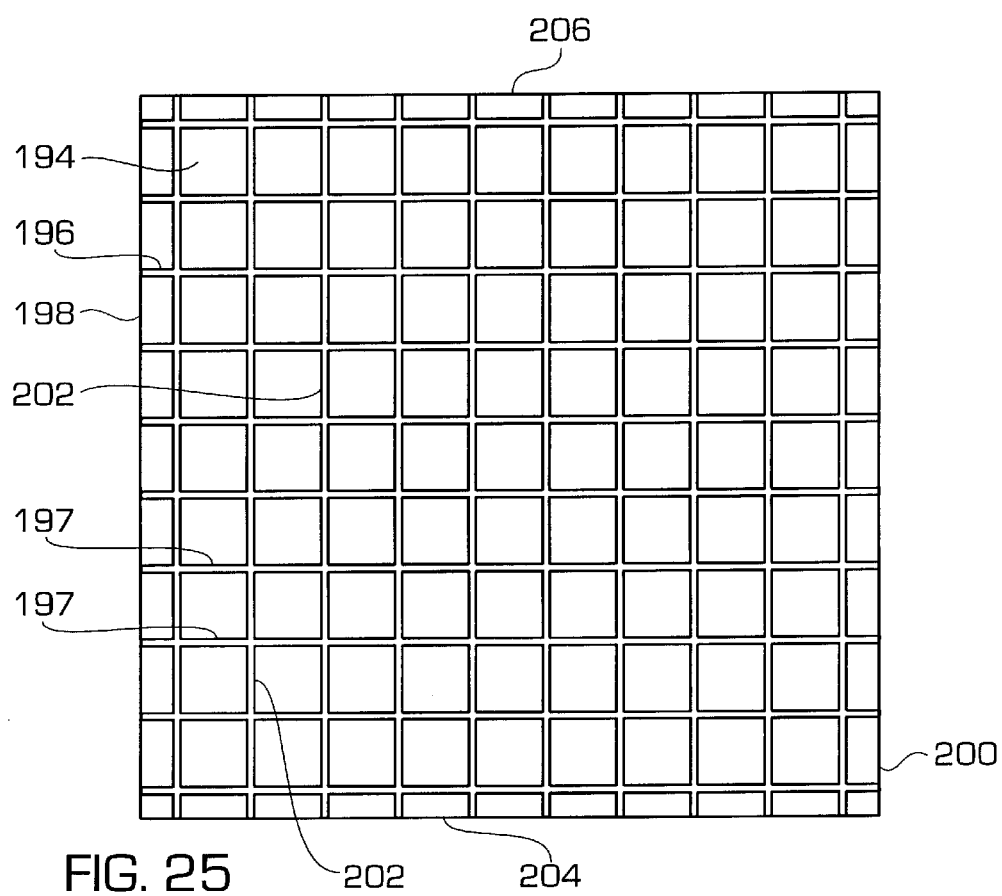
Figure 26:
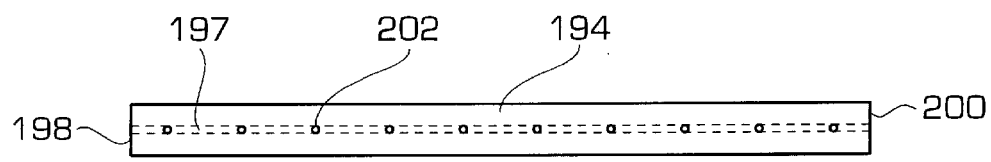

FIGS. 24–26 illustrates another foam body embodiment 194 having flame retardant reception cavities 196 equally dispersed throughout the volume of the foam body. In similar fashion to foam body 156 in FIG. 19, foam body 194 includes a first series of equally spaced internal, central cavities 197 having a circular cross-section and extending between sides 198, 200 of foam body 194. Extending transversely and through the first series 197 is a second series of flame retardant dispersion cavities 202 which extend between sides 204 and 206 of foam body 194. This criss-crossing arrangement at the intermediate level of the foam body (see FIG. 26's schematic depiction of the criss-crossing cavities) facilitates a high and equal rate of dispersion throughout the foam body. A non-contact criss-crossing arrangement wherein one set of cylindrical reception cavities is positioned above the other, but still between the upper and lower surfaces of the foam body is also another preferred embodiment.

Figure 27:
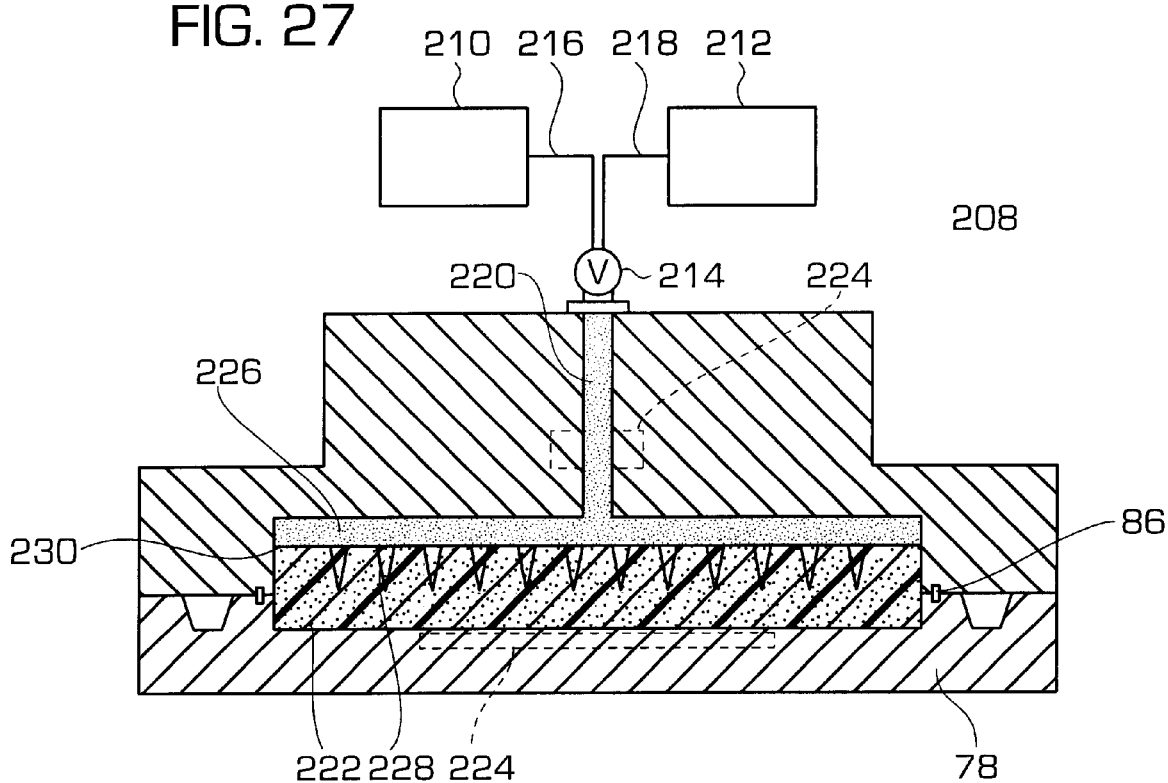
FIG. 27 shows another embodiment of the present invention featuring a combination cover layer providing and fire retardant dispersion assembly.

FIG. 27 illustrates a combination flame retardant application and coating material application assembly 208 which shares some similarities to the arrangement shown in FIG. 10 except for the differences set out below. Assembly 208 in FIG. 27 includes fluid sources (tanks in this case) 210 and 212 with valve 214 in fluid communication with conduits 216 and 218 extending from a respective one of tanks 210 and 212 along with passageway 220 extending into chamber 226 above foam body 222. As in the earlier embodiment, one or more heating units 224 can also be provided. Following formation of the reception cavities 228 in foam body 222 and placement of foam body 222 into assembly 208, valve 214 is shifted to enable flame retardant material from source 210 to feed into chamber 226 and into dispersion cavities 228 at a desired temperature and pressure. Following the desired degree of dispersion of the flame retardant in foam body 222, valve 214 is shifted to allow for coating material from source 212 to pass through conduit 220 for dispersion over the exposed upper surface 230 of foam body 222 (including reception cavities 228) so as to provide a covering layer over the same. The covering layer can take on any desired form such as a slurry with fine particles (e.g., sand, etc.). Although not shown, a suitable excess fluid or material exit system (e.g., a recycling, valved pipe assembly—not shown) can be utilized between applications of flame retardant and the covering layer. Alternately, two different input systems can be utilized instead of the shared system of FIG. 27 if the materials are not compatible or suited for a shared system.

Figure 28:
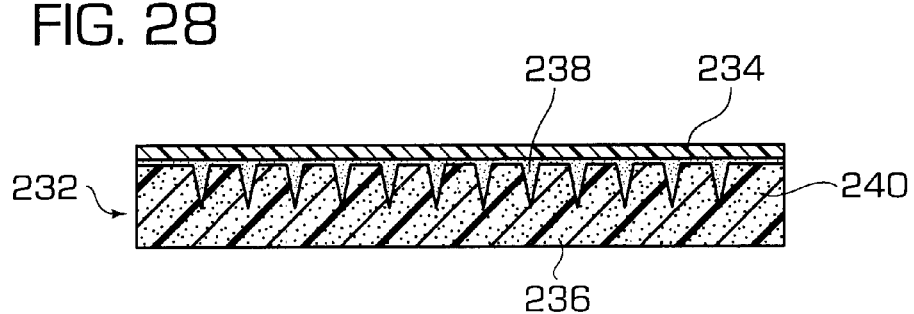
FIG. 28 shows a cross-sectional, side elevational view of a laminated foam body having a main foam body layer and an upper laminate foam layer adhered or otherwise adjoined with the underlying layer.

FIG. 28 illustrates a cross-section view of a laminate foam body structure 232 having one or more laminate layers 234 applied to an upper and/or lower and/or side surface of the foam body 236 one of which can include the flame retardant reception cavities 238 formed therein. In the embodiment of FIG. 28, the laminate layer is depicted as being another foam layer, but any suitable laminate layer can be attached to the main foam body with the added laminate or face sheet 234 joined to the foam body 236 in a post formation application of an adhesive or some other method such as in a post formation application of additional precursor material and subsequent heating such as described in U.S. Pat. No. 4,780,167, which is incorporated by reference.

Figure 29:
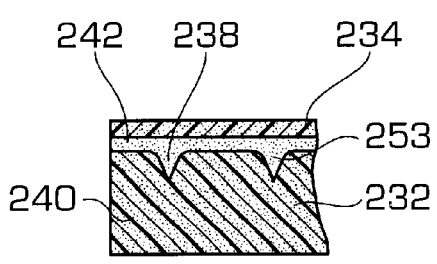
FIG. 29 shows an enlarged, cut-away view of the laminated foam body in FIG. 28.

FIG. 29 shows an enlarged view of a section of the foam body structure 232 in FIG. 28 with main foam body 240 having reception cavities 238 partially filled with an adhesive 242 or some other joining agent for joining the laminate 234 to main foam body 240. In a coating covering, rather than a face sheet lamination, the coating material would be a unitary body upon solidification possibly extending within the reception cavities (e.g., partially filling instead of covering over packed flame retardant material fully filling the cavity) and/or provided on the exposed surface of the foam body around the cavities. The present invention also features the mixing of a flame retardant in with a suitable adhesive within the cavities and/or on the surface about the cavities to join a laminate to the main body. If the flame retardant and adhesive mix is supplied only to the manufactured reception cavities, then a spot adhesion technique can be relied upon. Alternatively, the flame retardant (e.g., granular) can be supplied free of any adhesive component and the adhesive material can be supplied either only in the foam body surface surrounding the cavities or across the whole surface to achieve laminate attachment. These examples illustrate just a few of the ways in which encapsulating cover can be provided to the foam body with reception cavities.

Figure 30:
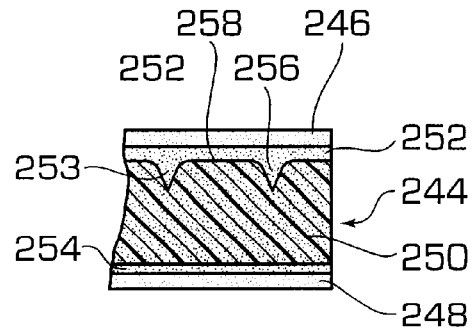
FIG. 30 shows a cut-away, cross-sectional view of an alternate laminated body having a central foam core sandwiched between two outer layers shown as wood in this particular embodiment.

FIG. 30 shows an alternate laminate foam body structure 244 having both an upper laminate or face sheet 246 and a lower laminate or face sheet 248 joined to main foam body 250 with a suitable joining agent layers 252 and 254 which can be of a same or different material. As with the FIG. 29 embodiment, the joining material is shown as flowing into and partially filling the retardant reception cavities 256 so as to encapsulate the previously applied fire retardant material which was applied as a coating or supplied so as to partially fill the flame retardant reception cavity or cavities. The coating layer of fire retardant material can be the result of, for example, a liquid absorption of fire retardant material or a dried film coating (e.g., a dried liquid/particle suspension). A more complete or full filling of a cavity is typically utilized when providing a powder, granular or tablet form fire retardant material to the cavity or cavities.

In the embodiment of FIGS. 29 and 30, a built up coating of fire retardant material is designated at 253, although, as noted above, retardant material can also be added into the adhesive as a supplement and/or as the means for filling the formed reception cavities, although the adhesive or other joining agent (including tacky foam layer of the foam body itself) can be applied just to the upper horizontal contacting surfaces 258 surrounding the reception cavities 256. Also, with other embodiments such as that described for FIG. 25, the flame retardant cavities are internalized whereby the upper and lower surfaces of the main foam body contacting the laminate are not disrupted. FIG. 30 also depicts the laminates as being a wood, or wood-based material, although any desired laminate sheet, layer or covering can be applied to the foam body under the technique of the present invention. It is noted that "laminate" is used in a broad sense in this application and includes a coating or the like applied in some fashion such as by spraying.

Figure 31:
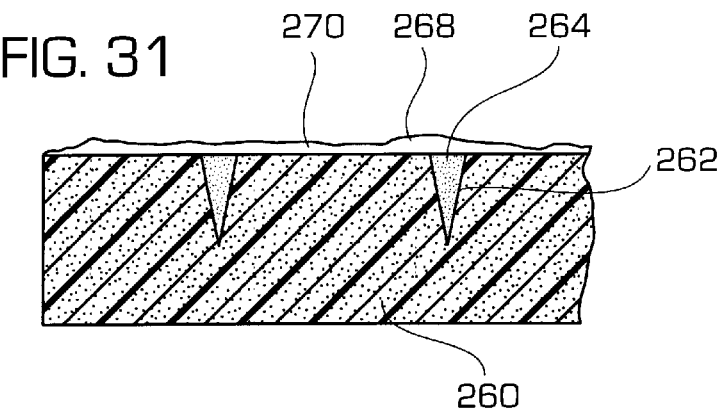
FIG. 31 shows a cut-away, cross-sectional view of an alternate laminated body embodiment having a powder or granular retardant material with the reception cavities and covered and entrapped by a surface coating.

FIG. 31 shows an alternate embodiment of the present invention featuring foam body 260 having formed reception cavities 262 (e.g., either during molding or in a post set-up cavity forming step) that are completely filled with a solid flame retardant material. The illustrated powdered or granular flame retardant material 264 is encased in cavities 26 by coating material 268 which is preferably applied over the entire surface 270 although it could be supplied only about a peripheral region surrounding the filled cavities and the exposed end of the cavities themselves in a cap-like arrangement. Also, although the illustrated embodiments illustrate a preferred encapsulating layer, coating or preformed laminate layer, the cavities can be left uncovered if the flame retardant material sufficiently attaches to the foam body and does not need either the protection or retainment functions provided by a covering. Also, where the foam body is to be encased but not necessarily affixed within a frame structure (e.g., between the box like panels of a door) encapsulating or covering even non-adhering flame retardant material may not be necessary depending upon the usage and assembling technique.

Figure 32:
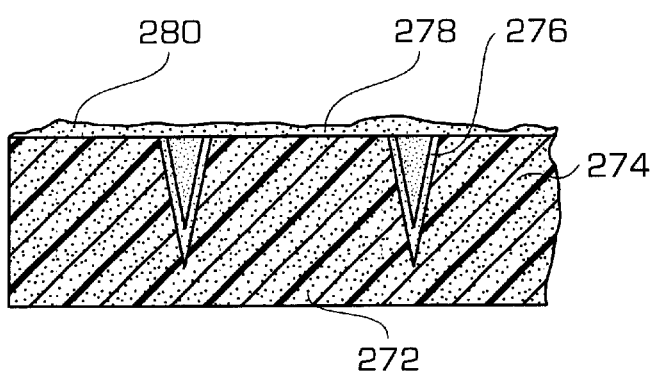
FIG. 32 shows a cut-away, cross-sectional view of an additional embodiment of the present invention with an outer coating which extends into the reception cavities which are partially filled with retardant material.

FIG. 32 illustrates foam body 272 having reception cavities 274 formed therein which have had a coating of flame retardant material 276 applied to them such as in a spray insertion technique of a liquid suspension of flame retardant particles which adhere to the rough surface of the foam material following drying. A suitable suspension includes for example. In addition, a coating layer 278 is applied over the entire upper surface 280 of foam body, also preferably in a spraying technique or post mold technique, and also into the remaining, non-filled in portions of cavities 274.

Figure 33:
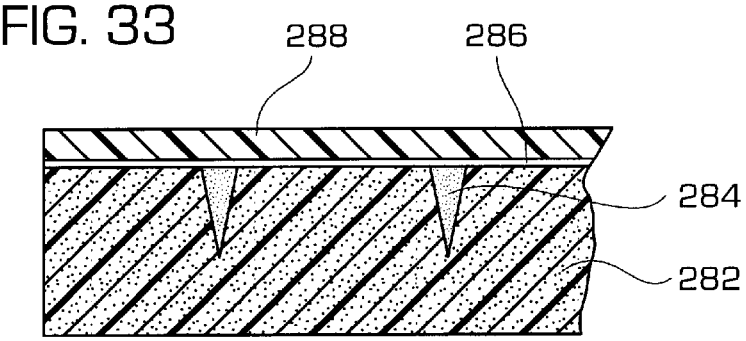
FIG. 33 shows still another cut-away, cross-sectional preferred embodiment of the present invention featuring an outer laminate adhered to a main foam body having tablet formed fire retardant material inserted so as to provide filled cavities.

FIG. 33 shows still another alternate embodiment of the present invention which features foam body 282 having reception cavities 284 formed therein and flame retardant material 286 in tablet form filling each of the cavities 284. Flame retardant material 286 is preferably encapsulated by a covering with foam layer 288 being one example of a suitable covering which is either adhered to foam body 282 or applied is a subsequent molding step or applied while the covering is still sufficiently tacky to join with foam body 282.

Figure 34:
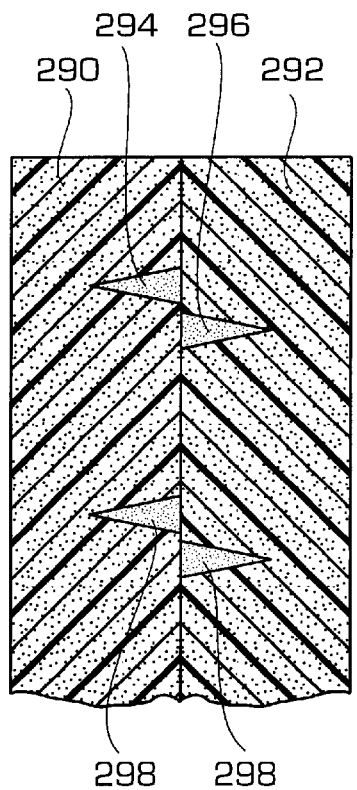
FIG. 34 shows a stacked arrangement of two foam bodies each having fire resistant cavities with fire-retardant contained therein.

FIG. 34 shows an alternate embodiment of the present invention wherein two foam bodies 290, 292 are adhered together which have an offset pattern of reception cavities 294, 296 which are covered over by the opposite foam body so as to entrap the flame retardant material 298 provided within the cavities.

Figure 35:
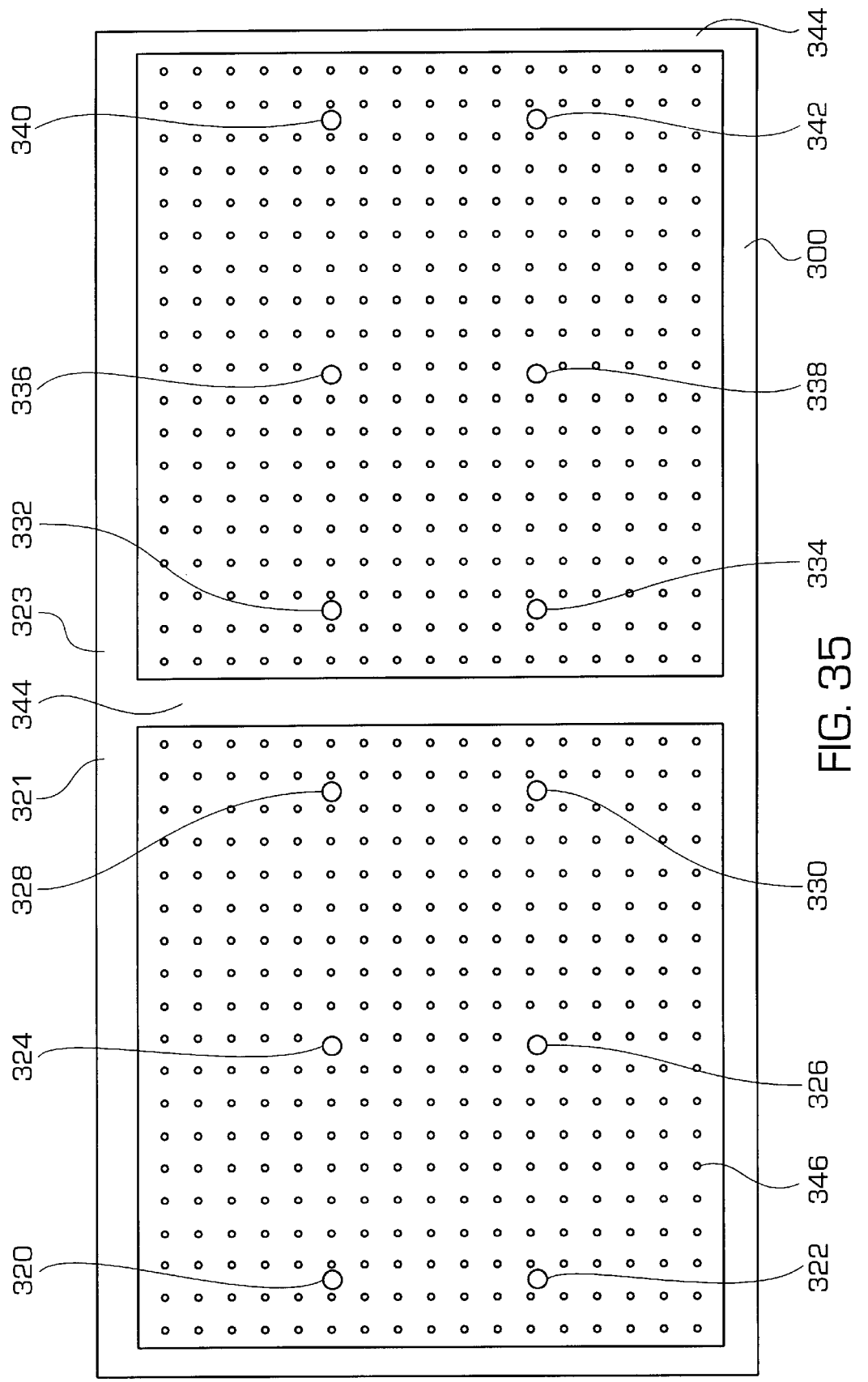
FIG. 35 shows a top plan view of the bottom half of a molding press having a plurality of cavity forming protrusions.
Figure 36:
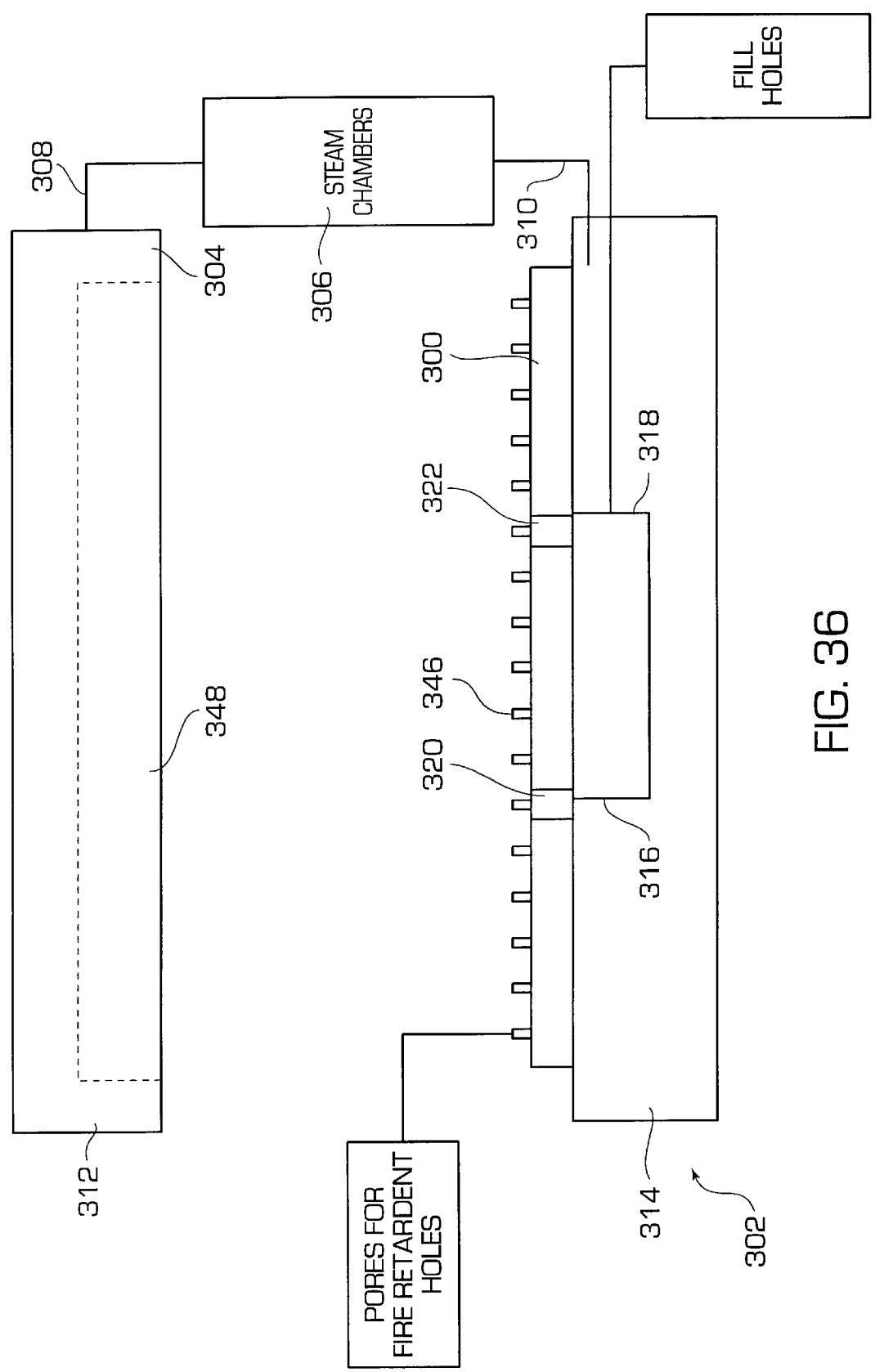
FIG. 36 shows a schematic illustration of the molding assembly which partially includes the bottom mold press of FIG. 35, a top mold press component and associated systems for temperature manipulation and polymer filling.

FIG. 35 provides a top plan view of a bottom mold half 300 particularly suited for expandable formulation molding processes such as one involving expandable polymeric beads having an entrapped blowing agent. FIG. 36 shows molding system 302 comprised of bottom mold component 300 and upper mold component 304. Both the upper and bottom mold components include heating means such as a steam chamber and a steam source 306 with steam lines 308 and 310 extending to respective steam chambers 312,314 defined by mold components 300 and 304. Positioned within steam chamber 314 or extending through encapsulated openings in steam chamber 314 are one or more polymeric bead fill lines such as the illustrated lines 316, 318 which feed into bead fill ports 320, 322.

Bead fill ports 320 and 322 are shown in FIG. 35 as well as 10 additional fill ports (324–342) spaced about first foam body forming section 321 and second foam body forming section 323 so as to provide for a quick and even dispersion of bead particles upon being pumped into a closed or essentially closed mold chamber as described in greater detail below. Bottom mold half 300 includes a border region 344 which extends about the bottom mold half to form the two foam body forming sections 321 and 323. This arrangement provides for rapid formation of two molded panels or the like, although a single or more than two foam body mold arrangement can also be utilized. A conventional general press such as a Kohler General Press manufactured by Kohler General Corporation of Sheboygan, Wis., can be used subject to the modifications described below for forming a foam body having the internal flame retardant reception cavities. That is, within the confines of border region 344 for first foam body section 321 a first array of flame retardant reception cavity forming projections 346 are provided, which as shown in FIGS. 35 and 36 are cylindrical in shape, equally distributed within the border region and extend upwardly above the border region so as to enter into the mold form cavity 348 upon closure of the top component onto the bottom component. The upward extension is sufficient for the cavities to extend deep enough into the formed foam body to achieve the above mentioned flame retardancy effect. A second set of similarly arranged projections 346 is also provided within second foam body formation section 323. The projections can be an added, integral part of the mold, or a removable section of the assembly such as a template plate provided in the bed of a general mold press.

In one preferred embodiment of the present invention using the system of FIG. 36, the foam body with preformed reception cavities is formed following steps and definitions 1–12 set out in Table I below.

TABLE I

| MOLDING PROCESS |
| --- |
| STEP DESCRIPTION |
| 1 Press is in the open position - press is closed. Press is set to leave a crack of ³⁄₁₆" between both halves of the mold for ease of filling. |
| 2 Material is air injected into the mold utilizing a fill gun. |
| 3 The machine completes the clamping process eliminating the ³⁄₁₆" gap. This is called crush. The mold is now completely closed. |
| 4 Preheat the mold with steam. |
| 5 Cross steam - all steam from one side of the mold. |
| 6 Cross steam - all steam from the other side of the mold. |
| 7 Autoclave system from both sides of the mold. |
| 8 Autoclave dwell - length of time the steam is on. |
| 9 Cooling water - the steam is turned off and water is sprayed to cool the mold and the part. |
| 10 Cooling dwell - length of time cooling water is on. |
| 11 Air eject from the stationary side of the mold. |
| 12 Clamp is opened for part removal. |

The material utilized in the sequence of steps described above is preferably expandable copolymer beads such as beads comprised of the thermoplastic polyphenylene (PPO)

surrounding an internal blowing agent core of pentane or the like or a polystyrene outer shelled bead (e.g., high impact polystyrene—HIPS) to name a few of the possible choices for forming foam body products in accordance with the present invention such as, for example, roof shingles or panels, wall panels and wood substitutes for furniture. The products are representative of just some of the products where high flame retardant qualities are desirable or required under particular building codes or association standards, and for which the present invention provides a highly advantageous solution to the problem of providing a high quality product capable of meeting high flame resistance standards.

The expandable beads are preferably injected into the press or mold assembly 302 by injection through fill ports 320–342 shown in FIG. 35 through use of a system which uses one or more injectors (e.g., a matching number of injectors) attached or otherwise associated with the fill ports. A preferred injector is one such as the lnjektorking Vario filling gun sold by KBM, Hillerod, Denmark, and Diversified Plastics Corp. of Nixa, Mo., which uses an air passageway directed out a nozzle to create a vacuum or suction draw on a feed line connected to an expandable bead supply source such that the beads are picked up in the air stream and directed through fill ports (320–342) due to the extension of the gun nozzle into the fill ports. By maintaining the above mentioned ³⁄₁₆" gap the pressure of the injected air can be dissipated without loss of injected beads.

Although not shown, the present invention also includes the formation of foam bodies with both the flame retardant material reception cavities and with varied density sections. For example, shiftable extensions in the form of pistons or the like can be shifted relative to the general mold defining chamber formed when the upper and lower mold components of the press shown in FIG. 36 are brought together and preferably after the foam material is introduced and before, during or immediately after the beads are subjected to a heat merge step. In this way, the shifting members act to compress the material that would normally expand the same amount as adjacent, non-compressed beads. In this way, solid or relatively more solid sections adjacent foam or more expanded sections of the foam body are created. The compressed sections can be formed adjacent or in place of the flame retardant reception cavities, although providing flame retardant material to a non-densified chamber wall is preferred for use in preventing flame spread and other flame retardant material functions.

What is claimed is:

1. A foam body structure, comprising:
a foam body having one or more flame retardant reception cavities formed therein and a flame retardant material received by said one or more flame retardant cavities, and wherein said flame retardant material is received in said one or more reception cavities and trapped within said reception cavities by a covering.

2. A foam body structure as recited in claim 1, wherein said foam body is a plastic foam body with one or more reception cavities dispersed throughout the foam body such that the foam body structure has an essentially uniform flame retardation characteristic over its entire body.

3. A foam body structure as recited in claim 1, wherein said foam body is a plastic foam body with a plurality of flame retardant reception cavities are distributed across at least one exposed surface of said foam body so as to provide said foam body structure with a flame retardation characteristic which is fictionally the same over the entire exposed surface.

4. A foam body structure as recited in claim 1, wherein a repeating pattern of flame retardant reception cavities are formed in said foam body.

5. A foam body structure as recited in claim 4, wherein the reception cavities are in the form of vertical holes having a top end opening out at an exterior surface of said foam body and a closed off bottom end.

6. A foam body structure as recited in claim 5, wherein said holes are arranged in a repeating series of rows of spread apart holes.

7. A foam body structure as recited in claim 5, wherein said holes extend through 25% to 95% of a vertical thickness of said foam body.

8. A foam body structure as recited in claim 1, wherein a plurality of reception cavities are formed in the foam body which extend internally within said foam body below an upper surface of said foam body and above a lower surface of said foam body so as not to open out in either said upper or lower surface.

9. A foam body structure as recited in claim 8, wherein said reception cavities include a first series of cavities that extend between two side walls of said foam body so as to leave the upper end lower surface of the foam body undisturbed.

10. A foam body structure as recited in claim 9, wherein said reception cavities include a second series of cavities which are in a non-parallel relationship with said first series.

11. A foam body structure as recited in claim 1, wherein said flame retardant material is a solid material which is received in said one or more reception cavities.

12. A foam body structure as recited in claim 1, wherein said flame retardant reception cavity includes a plurality of slits or grooves formed in said foam body.

13. A foam body structure as recited in claim 1, wherein said reception cavities are grooves that extend down for a depth greater than 50% of a vertical thickness of said foam body.

14. A foam body structure as recited in claim 1, wherein said foam body is formed of expanded polymeric material that has been shaped by a mold and said flame retardant reception cavities are defined by expanded polymeric material which has contacted a reception cavity formation member during molding.

15. A foam body as recited in claim 1 wherein the foam body is a plastic foam roof covering member.

16. A foam body as recited in claim 1 wherein the foam body is a plastic foam wall panel.

17. A foam body as recited in claim 1 wherein the foam body is a plastic foam furniture piece.

18. A method of forming a flame retardant plastic foam body structure as recited in claim 1, comprising:
introducing flame retardant material into the one or more flame retardant material reception cavities formed in the plastic foam body such that the flame retardant material is dispersed sufficiently within the volume of said foam body as to provide an essentially common flame retardation quality over the entire foam body, and covering over said flame retardant material.

19. A method as recited in claim 18, wherein there is provided a sufficient number and size of reception cavities and a sufficient quantity of said flame retardant material introduced into said one or more flame retardant reception cavities so as to satisfy the requirements of one or more of the following standards: a) UL-790 (1977); and b) ASTM E 108-90.

20. A method as recited in claim 18, wherein introducing the flame retardant material includes filling the reception cavities with a solid flame retardant material prior to covering said reception cavities.

21. A method as recited in claim 18, further comprising the step of forming the foam body.

22. A method as recited in claim 21, wherein said foam body is formed in a molding process.

23. A method as recited in claim 22, wherein said flame retardant reception cavities are formed in said foam body during the molding of the foam body.

24. A method as recited in claim 23, wherein the step of molding reception cavities includes injecting expandable polymeric beads about a plurality of reception cavity forming projections within the mold space.

25. A method as recited in claim 21, wherein said flame retardant cavities are formed by removing foam material following a substantial or complete setting up of foam material in said foam body.

26. A method as recited in claim 25, wherein a pattern of holes, cavities or recesses are formed in the foam body to constitute said flame retardant cavities.

27. A method as recited in claim 26, wherein introducing the flame retardant material includes positioning a dispersion feed member within or above one or more of said flame retardant reception cavities and passing flame retardant material out of said dispersion feed member and into said one or more flame retardant reception cavities.

28. A method as recited in claim 25, wherein introducing flame retardant material includes supplying a pile of solid flame retardant material to each of said reception cavities.

29. A method as recited in claim 23, wherein providing said cover layer includes providing said cover layer so that said cover layer contacts the flame retardant material applied to said flame retardant reception cavities.

30. A method as recited in claim 29, wherein providing said cover layer includes providing said cover material while in fluid or flowable form at the time of application so as to form a coating cover that conforms to the surface configuration of said foam body with reception cavities formed therein.

31. A method as recited in claim 18, wherein said cover is a laminate sheet that extends over one or more openings of the flame retardant reception cavities formed in said foam body.

32. A foam body structure, comprising:
a foam body having one or more flame retardant reception cavities formed therein and a flame retardant material received by said one or more flame retardant cavities a wherein said flame retardant material is a solid material which is received in said one or more reception cavities, and wherein said reception cavities containing said solid flame retardant material are covered with a covering.

33. A foam body structure as recited in claim 32 wherein said solid material is in the form of tablets or pellets.

34. A foam body structure, comprising:
a foam body having one or more flame retardant reception cavities formed therein and a flame retardant material received by said one or more flame retardant cavities, and said foam body structure further comprising a covering positioned over said reception cavities.

35. A foam body structure as recited in claim 34, wherein said covering is a covering layer in contact with said flame retardant material and the foam material bordering said one or more reception cavities.

36. A foam body structure as recited in claim 35, wherein said covering is a preformed laminate joined to an exposed surface of said foam body within which flame retardant reception cavities are formed and extending over surface openings in said foam body defined by a plurality of flame retardant reception cavities.

37. A foam body structure as recited in claim 35 wherein said covering is a second foam body having a second series of reception cavities formed therein, and said second series of reception cavities are in a staggered relationship with respect to the reception cavities of the foam body which is covered by said second foam body.

38. A foam body structure as recited in claim 34, further comprising a coating material received within said reception cavities so as to cover a film of the flame retardant material received within said one or more reception cavities and said coating material being in contact with a surface of said foam body within which the reception cavities are formed.

39. A fire retardant plastic foam body structure comprising:
a plastic foam body having one or more reception cavities formed therein;
a flame retardant material positioned within said one or more reception cavities so as to provide a concentrated flame retardation effect at said one or more reception cavities;
trapping means for trapping said flame retardant material within said one or more reception cavities, and wherein said fire retardant material is a solid material packed within a plurality of said reception cavities dispersed over said foam body and said trapping means is a cover extending over said one or more reception cavities.

* * * * *